United States Patent
Venkataramani et al.

(10) Patent No.: US 10,185,824 B2
(45) Date of Patent: Jan. 22, 2019

(54) SYSTEM AND METHOD FOR UNCOVERING COVERT TIMING CHANNELS

(71) Applicant: THE GEORGE WASHINGTON UNIVERSITY, Washington, DC (US)

(72) Inventors: Guru Prasadh V. Venkataramani, Fairfax, VA (US); Jie Chen, Arlington, VA (US)

(73) Assignee: The George Washington University, Washington, DC (US)

( * ) Notice: Subject to any disclaimer, the term of this patent is extended or adjusted under 35 U.S.C. 154(b) by 127 days.

(21) Appl. No.: 15/313,785

(22) PCT Filed: May 26, 2015

(86) PCT No.: PCT/US2015/032443
§ 371 (c)(1),
(2) Date: Nov. 23, 2016

(87) PCT Pub. No.: WO2015/179865
PCT Pub. Date: Nov. 26, 2015

(65) Prior Publication Data
US 2017/0154181 A1    Jun. 1, 2017

Related U.S. Application Data

(60) Provisional application No. 62/063,022, filed on Oct. 13, 2014, provisional application No. 62/002,484, filed on May 23, 2014.

(51) Int. Cl.
*G06F 21/55* (2013.01)
*G06F 21/56* (2013.01)
(Continued)

(52) U.S. Cl.
CPC ............ *G06F 21/556* (2013.01); *G06F 21/53* (2013.01); *G06F 21/566* (2013.01); *G06F 21/85* (2013.01); *H04L 9/005* (2013.01)

(58) Field of Classification Search
CPC .............................. H04L 9/005; G06F 21/556
See application file for complete search history.

(56) References Cited

U.S. PATENT DOCUMENTS 7,877,621 B2 * 1/2011 Jacoby ............... G06F 21/55
                                                    713/300
9,009,385 B1 * 4/2015 Juels .................. G06F 3/0622
                                                    711/130

(Continued)

OTHER PUBLICATIONS

Wu et al.; C2Detector: a covert channel detection framework in cloud computing; 2013; Retrieved from the Internet <URL: https://onlinelibrary.wiley.com/doi/full/10.1002/sec.754>; pp. 1-14, as printed (Year: 2013).*

(Continued)

*Primary Examiner* — Saleh Najjar
*Assistant Examiner* — Michael W Chao
(74) *Attorney, Agent, or Firm* — Blank Rome LLP

(57) ABSTRACT

A system detects a covert timing channel on a combinational structure or a memory structure. The system identifies the events behind conflicts, and constructs an event train based on those events. For combinational structures, the system detects recurrent burst patterns in the event train. The system determines that a covert timing channel exists on the combinational structure if a recurrent burst pattern is detected. For memory structures, the system detects oscillatory patterns in the event train. The system determines that a covert timing channel exists on the memory structure if an oscillatory pattern is detected.

17 Claims, 14 Drawing Sheets

(51) Int. Cl.
*H04L 9/00* (2006.01)
*G06F 21/53* (2013.01)
*G06F 21/85* (2013.01)

(56) References Cited

U.S. PATENT DOCUMENTS

| | | | |
|---|---|---|---|
| 10,025,929 B2* | 7/2018 | Sethumadhavan | ... G06F 21/566 |
| 2002/0091996 A1 | 7/2002 | Topham | |
| 2002/0152056 A1 | 10/2002 | Herzog et al. | |
| 2003/0045270 A1 | 3/2003 | Agrawal et al. | |
| 2006/0282660 A1 | 12/2006 | Varghese et al. | |
| 2011/0228926 A1* | 9/2011 | Shumow | ............... G06F 21/556 380/1 |
| 2011/0276744 A1* | 11/2011 | Sengupta | ............ G06F 12/0866 711/103 |
| 2013/0031600 A1 | 1/2013 | Luna et al. | |
| 2013/0097387 A1* | 4/2013 | Sanchez Martin | ......................... G06F 12/0862 711/129 |
| 2013/0326154 A1* | 12/2013 | Haswell | .............. G06F 12/0864 711/141 |
| 2014/0041032 A1* | 2/2014 | Scheper | .................. H04L 63/14 726/23 |
| 2015/0134973 A1* | 5/2015 | Maytal | .................. G06F 21/556 713/190 |
| 2015/0135262 A1* | 5/2015 | Porat | ..................... G06F 21/552 726/1 |
| 2016/0044059 A1* | 2/2016 | Fine | .................... H04L 63/1416 726/23 |
| 2016/0140340 A1* | 5/2016 | Walters | ................. G06F 21/556 726/22 |
| 2016/0259942 A1* | 9/2016 | Wang | ................. G06F 21/556 |
| 2016/0275288 A1* | 9/2016 | Sethumadhavan | ... G06F 21/566 |

OTHER PUBLICATIONS

International Search Report and Written Opinion for PCT/US2015/032443, dated Aug. 21, 2015, 7 pages.

Mortiz Lipp et al. "Meltdown", arXiv:1801.01207, Jan. 3, 2018, pp. 1-16.

\* cited by examiner

SYSTEM AND METHOD FOR UNCOVERING COVERT TIMING CHANNELS

RELATED APPLICATIONS

This application is a national phase of PCT/US2015/032443, filed on May 26, 2015, which claims the benefit of U.S. Provisional Application Nos. 62/002,484, filed May 23, 2014, and 62/063,222, filed Oct. 13, 2014. The entire contents of those applications are incorporated herein by reference.

GOVERNMENT LICENSE RIGHTS

This invention was made with Government support under Grant No. 1149557 awarded by the National Science Foundation. The U.S. Government has certain rights in this invention.

BACKGROUND OF THE INVENTION

Field of the Invention

The present invention relates to the use of timing channels. More particularly, the present invention relates to uncovering covert timing channels on shared processor hardware.

Background of the Related Art

As we increasingly rely on computers to process and manage our personal data, safeguarding sensitive information from malicious hackers is a fast growing concern. Among many forms of information leakage, covert timing channels operate by establishing an illegitimate communication channel between two processes and through transmitting information via timing modulation, thereby violating the underlying system's security policy. Recent studies have shown the vulnerability of popular computing environments, such as cloud computing, to these covert timing channels.

Information leakage is a fast growing concern affecting computer users that is exacerbated by the increasing amount of shared processor hardware. Every year, there are hundreds of news reports on identity thefts and leaked confidential information to unauthorized parties. NIST National Vulnerability Database reports an increase of 11× in the number of information leak/disclosure-related software issues over the past five years (2008-2013), compared to the prior decade (1997-2007) [1].

As illustrated in FIG. 1A, covert timing channels are information leakage channels where a trojan process 10 (operating on a processing device 100) intentionally modulates the timing of events on certain shared system resources 14 of that processor 100 to illegitimately reveal sensitive information to a spy process 10' (operating on the compromised processing device 100). The Trojan process 10 and the spy process 10' are two separate applications (software) that use the shared hardware resources inside the processor 100. The Trojan process 10 is typically at a higher privilege level than the spy process 10', so that the Trojan and spy cannot communicate directly, as represented by arrow 12. The trojan process 10 (sometimes referred to below as "trojan") and the spy process 10' (sometimes referred to below as "spy") do not communicate explicitly through send/receive or shared memory, but covertly via modulating the timing of certain events. In contrast to side channels where a process unintentionally leaks information to a spy process, covert timing channels have an insider trojan process (with higher privileges) that intentionally colludes with a spy process (with lower privileges) to exfiltrate the system secrets.

To achieve covert timing based communication on shared processor hardware, a fundamental strategy used by the trojan process is to modulate the timing of events by intentionally creating conflicts (here, a "conflict" collectively denotes methods that alter either the latency of a single event or the inter-event intervals.). The spy process deciphers the secrets by observing the differences in resource access times. On hardware units such as compute logic and wires (buses/interconnects), the trojan creates conflicts by introducing distinguishable contention patterns on accesses to the shared resource. On caches, memory and disks, the trojan creates conflicts by intentionally replacing certain memory blocks such that the spy can decipher the message bits based on the memory hit/miss latencies. This basic strategy of creating conflicts for timing modulation has been observed in numerous covert timing channel implementations [2], [3], [4], [5], [6], [7], [8], [9], [10].

SUMMARY OF THE INVENTION

Accordingly, it is an object of the invention to uncover (i.e., detect or identify) covert timing channels. It is a further object of the invention to uncover covert timing channels on shared processor hardware. According to one aspect of the invention, a covert timing channel detection system is provided as a new microarchitecture-level framework to detect the possible presence of covert timing channels on shared processor hardware. An algorithm detects recurrent burst and oscillation patterns on certain key indicator events associated with the covert timing channels. Examples of covert timing channels are provided on three different types of processor hardware-wires (memory bus/Quick Path Interconnect or QPI for short), logic units (integer divider) and memory (on-chip caches). We can detect covert timing channels at altered bandwidth rates, message bit combinations and number of cache blocks. At low bandwidths, more frequent analysis (at finer grain windows of observation) may be necessary to improve the probability of detection. Through experiments on I/O, memory, CPU-intensive benchmarks such as Filebench [39], SPEC2006 [40] and Stream [41] that are known to have no covert channels, we show that our framework does not have any false alarms.

Thus, a covert timing channel detection system and method is provided having a novel framework that detects the presence of covert timing channels by dynamically tracking conflict patterns on shared processor hardware. The covert timing channel detection system offers low-cost hardware support that gathers data on certain key indicator events during program execution, and provides software support to compute the likelihood of covert timing channels on a specific shared hardware. Many prior works on covert channels have studied mitigation techniques for specific hardware resources such as caches [7] and bus/interconnect [2], [3], [11]. These techniques can neatly complement our covert timing channel detection system framework by mitigating the damages caused by covert timing channels after detection. The present invention does not attempt to detect network-based covert information transfer channels [12], [13], software-based channels (e.g., data objects, file locks) [14] and side channels [15], [16]. However, the present invention can be applied in other applications that use contention or conflicts for covert communication.

The framework of the present invention is particularly beneficial to users as we transition to an era of running applications on remote servers that host programs from many different users. Recent studies [6], [9] show how popular computing environments like cloud computing are vulnerable to covert timing channels. Static techniques to eliminate timing channel attacks such as program code analyses are virtually impractical to enforce on every third-party software, especially when most of these applications are available only as binaries. Also, adopting strict system usage policies (such as minimizing system-wide resource sharing or fuzzing the system clock to reduce the possibility of covert timing channels) could adversely affect the overall system performance. To overcome these issues, the covert timing channel detection system of the present invention has a dynamic detection that is a desirable first step before adopting damage control strategies like limiting resource sharing or bandwidth reduction.

In one embodiment of the invention, a new microarchitecture-level framework, the covert timing channel detection system is provided that detects the possible presence of covert timing channels on shared hardware. The present invention is able to successfully detect different types of covert timing channels at varying bandwidths and message patterns.

Several advantages of the invention include: 1) a covert timing channel detection system, which is a novel microarchitecture-level framework to detect shared hardware-based covert timing channels by monitoring for conflicts. 2) Algorithms that extract recurrent (yet, sometimes irregular) conflict patterns used in covert transmission, and show our implementation in hardware and software. 3) We evaluate the efficacy of our solution using covert timing channels on three different types of shared hardware resources, namely wires (memory bus/QPI), logic (integer divider) and memory (shared L2 cache). Our experiments demonstrate that the present invention is able to successfully detect different types of covert timing channels at varying bandwidths and message patterns, and has zero false alarms for the cases we tested.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1A:
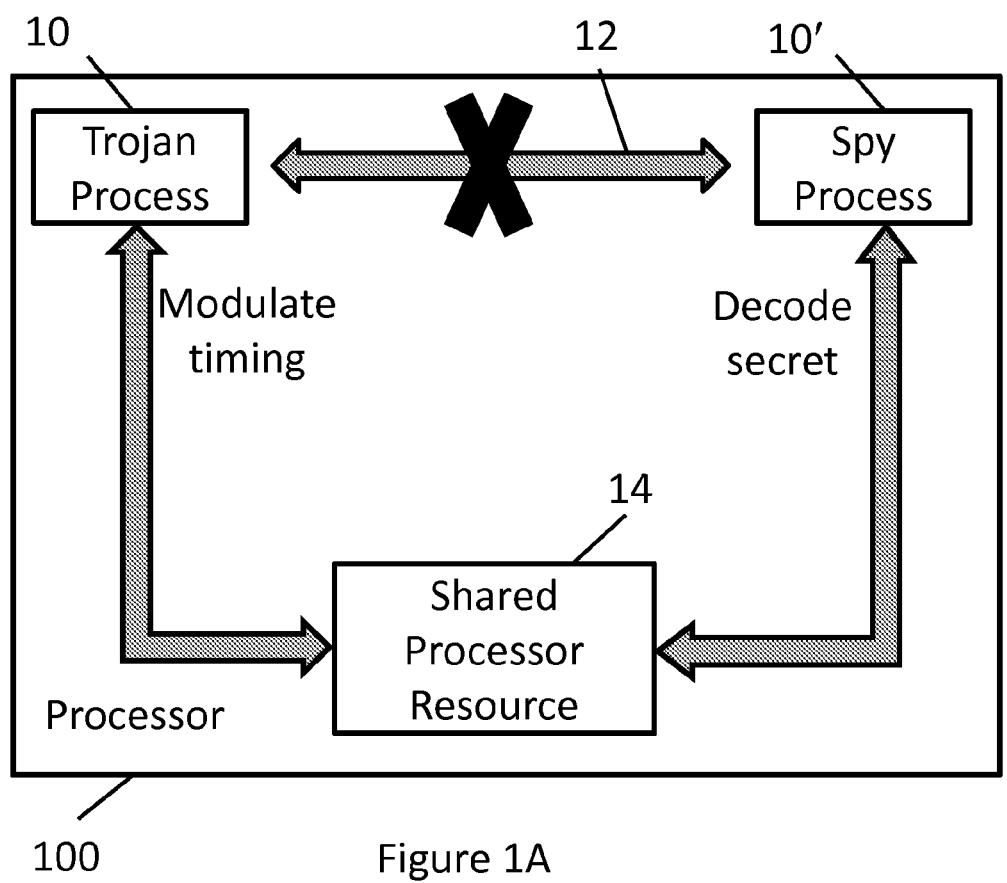
FIG. 1A is an overview of the system having a shared resource.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 1B:
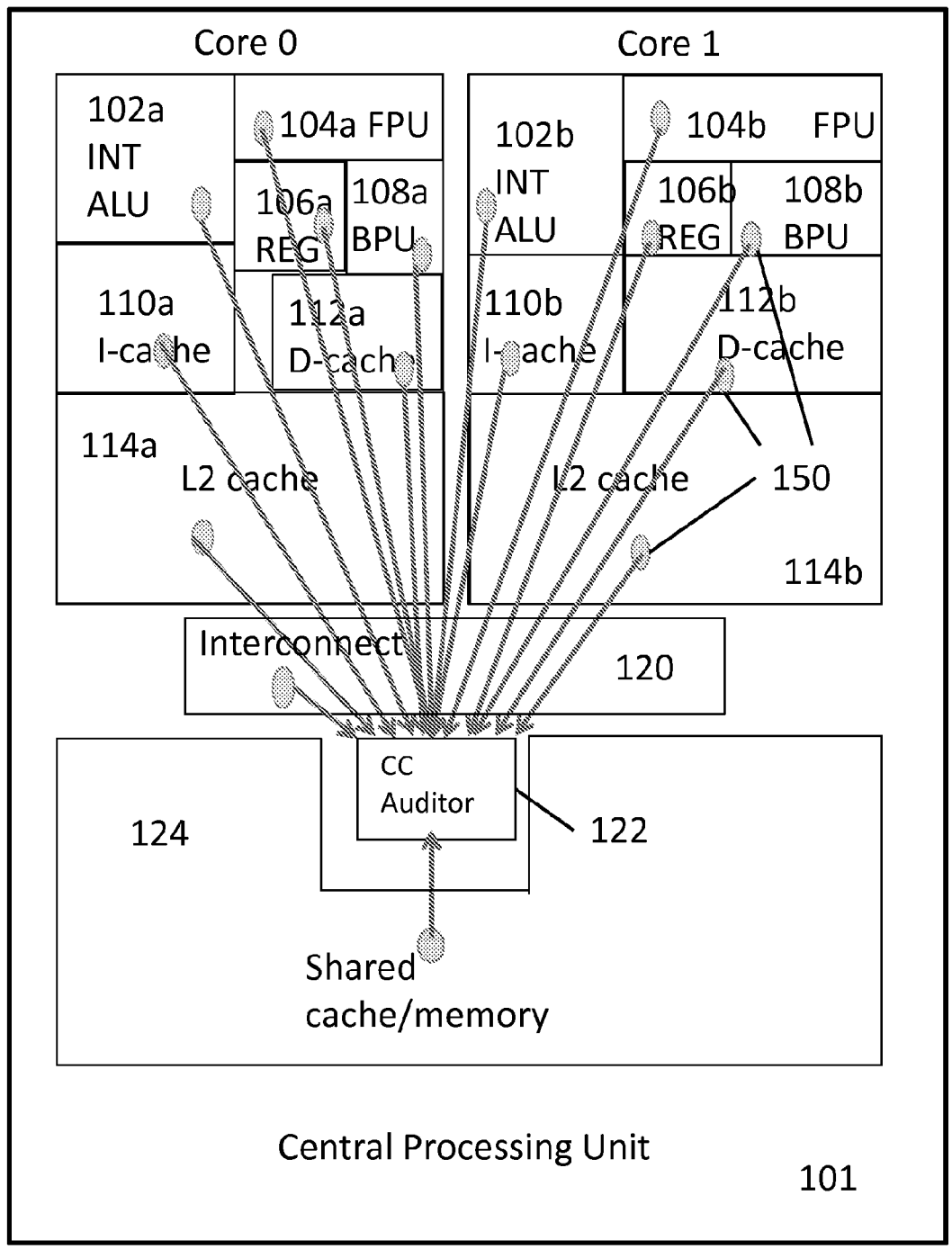
FIG. 1B is a block diagram of the processing device of FIG. 1A.

Referring to FIG. 1B, an overview of the covert timing channel detection system 100, as implemented in the processor unit 100', is shown. The covert timing channel detection system 100 can be implemented on any processor unit, though in the non-limiting illustration of the embodiment of FIG. 1A, 1B, the system 100 is implemented on the processor 100'. The processing device 100 can be any electronic processing device such as a personal computer, processor, ASIC, smart phone or the like. And, the processing device 100 can have a memory, a display device, a user input device (such as a touchscreen, mouse, keyboard or the like), and wired and/or wireless communications.

Figure 1C:
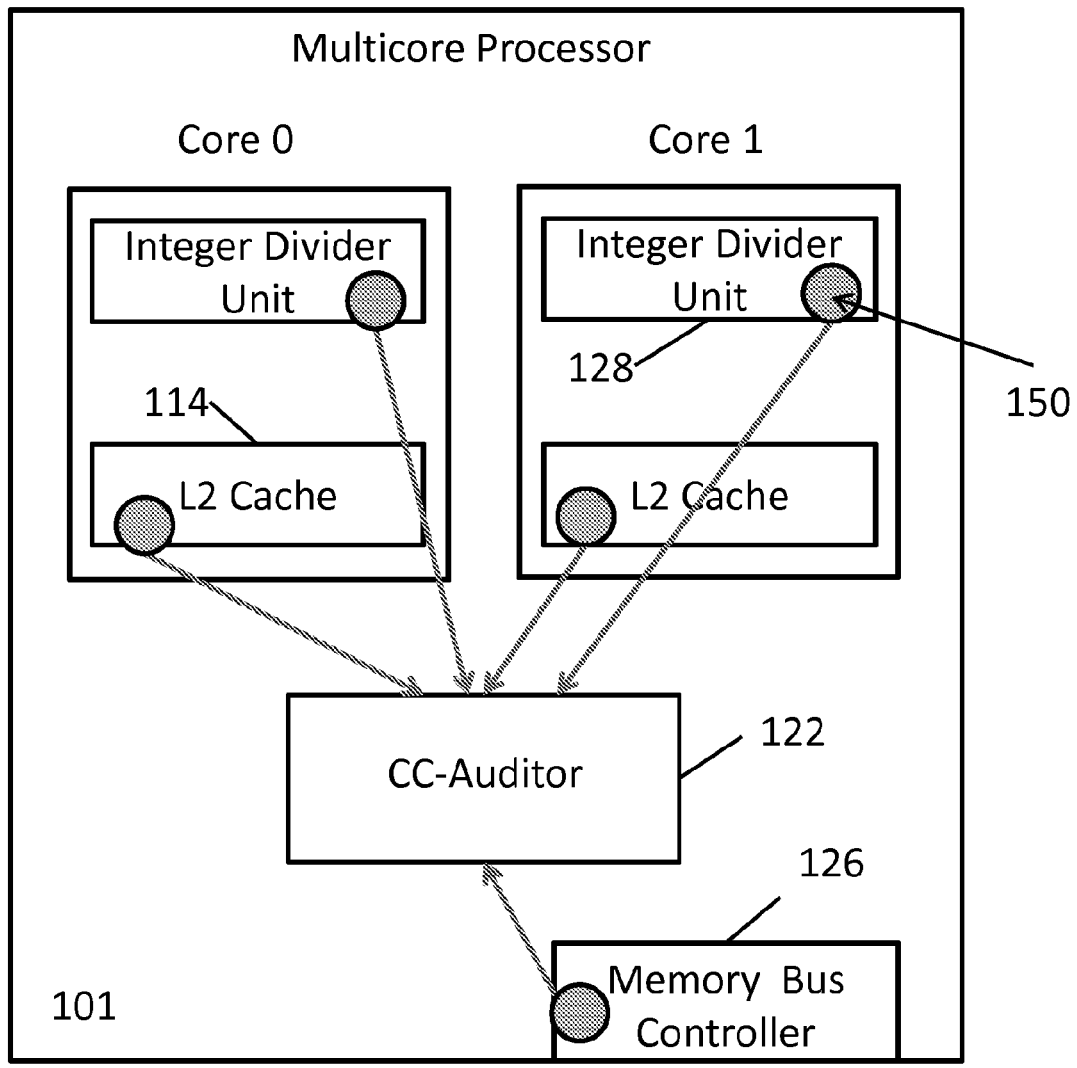
FIG. 1C is an abbreviated block diagram of the processor hardware from FIG. 1A.

The processing device 100 can have a number of components, including combinational structures and memory structures. The combinational structures include an Integer Arithmetic Unit (INT ALU) 102a, 102b, Floating Point Unit (FPU) 104a, 104b, and the interconnect 120. The memory structures include an Instruction cache (I-cache) 110a, 110b, Data cache (D-cache) 112a, 112b, and Level 2 cache (L2 cache) 114a, 114b. In addition, the processing device 100 can have a register file (REG) 106a, 106b and a Branch Prediction Unit (BPU) 108a, 108b. Of course, other suitable hardware components can be provided and utilized by the system 100. FIG. 1C shows a simplified diagram of FIG. 1B, but also showing a memory bus controller 126 and an integer divider unit 128. The memory bus controller 126 is used to control the memory bus (which is a combinational structure).

The covert timing channel detection system and method of the present invention is implemented by computer software that can be executed by a central processing unit (CPU) 101 and stored on a storage device such as memory, computer hard drive, CD ROM disk or on any other appropriate data storage device; such as in L2 cache 114a, 114b, I-cache 110a, 110b, D-cache 112a, 112b or in persistence storage device such as hard disk or SSD. The entire process is conducted automatically by the processor, and without any manual interaction. Accordingly, the process can occur substantially in real-time without any delays.

Understanding Covert Timing Channels

Trusted Computer System Evaluation Criteria (or TCSEC, The Orange Book) [17] defines a covert channel as any communication channel that can be exploited by a process to transfer information in a manner that violates the system's security policy. In particular, covert timing channels are those that would allow one process to signal information to another process by modulating its own use of system resources in such a way that the change in response time observed by the second process would provide information.

Note that, between the trojan and the spy, the task of constructing a reliable covert channel is not very simple. Covert timing channels implemented on real systems take significant amounts of synchronization, confirmation and transmission time even for relatively short-length messages. As examples, (1) Okamura et al. [4] construct a memory load-based covert channel on a real system, and show that it takes 131.5 seconds just to covertly communicate 64 bits in a reliable manner achieving a bandwidth rate of 0.49 bits per second; (2) Ristenpart et al. [6] demonstrate a memory-based covert channel that achieves a bandwidth of 0.2 bits per second. This shows that the covert channels create non-negligible amounts of traffic on shared resources to accomplish their intended tasks.

TCSEC points out that a covert channel bandwidth exceeding a rate of one hundred (100) bits per second is classified as a high bandwidth channel based on the observed data transfer rates between several kinds of computer systems. In any computer system, there are a number of relatively low-bandwidth covert channels whose existence is deeply ingrained in the system design. If bandwidth-reduction strategy to prevent covert timing channels were to be applied to all of them, it becomes an impractical task. Therefore, TCSEC points out that channels with maximum bandwidths of less than 0.1 bit per second are generally not considered to be very feasible covert timing channels. This does not mean that it is impossible to construct very low bandwidth covert timing channel, just that it becomes very expensive and difficult for the adversary (spy) to extract any meaningful information out of the system.

Threat Model and Assumptions

Our threat model assumes that the trojan wants to intentionally communicate the secret information to the spy covertly by modulating the timing on certain hardware. We assume that the spy is able to seek the services of a compromised trojan that has sufficient privileges to run inside the target system. As confinement mechanisms in software improve, hardware-based covert timing channels will become more important. So, we limit the scope of our work to shared processor hardware.

A hardware-based covert timing channel could have noise due to two factors—(1) processes other than the trojan/spy using the shared resource frequently, (2) the trojan artificially inflating the patterns of random conflicts to evade detection by the covert timing channel detection system 100. In both cases, the reliability of covert communication is severely affected resulting in loss of data for the spy as evidenced by many prior studies [10], [18], [19]. For example, on a cache-based covert timing channel, Xu et al. [10] find that the covert transmission error rate is at least 20% when 64 concurrent users share the same processor with the trojan/spy. Therefore, it is impossible for a covert timing channel to just randomly inflate conflict events or operate in noisy environments simply to evade detection. In light of these prior findings, we model moderate amounts of interference by running a few other (at least three) active processes alongside the trojan/spy processes.

The present invention focuses on the detection of covert timing channels rather than showing how to actually construct or prevent them. We do not evaluate the robustness of covert communication itself that has been demonstrated adequately by prior work [6], [9], [10]. We assume that covert timing based communication happens through recurrent patterns of conflicts over non-trivial intervals of time. The present invention cannot detect the covert timing attacks that happen instantly where the spy has the ability to gain sensitive information in one pass. Also, covert timing channels that employ sophisticated combinations of timing and storage channels at both hardware and software layers are not considered in this work. Finally, we assume that the system software modules (including the operating system kernel and security enforcing layers) are trusted.

Design Overview

From the perspective of covert timing channels that exploit shared hardware, there are two categories: (1) Combinational structures such as logic and wires, relying on patterns of high and low contention to communicate on the corresponding shared resource. Consequently, a recurrent (yet sometimes irregular) pattern of contention (conflicts) would be observed in the corresponding event time series during covert communication. (2) Memory structures, such as caches, DRAM and disks, using intentional replacement of memory blocks (previously owned by the spy) to create misses. As a result, we observe a recurrent pattern of cache conflict misses.

The present invention utilizes design algorithms to identify the recurrent patterns in the corresponding event time series (there are studies in neuroscience that analyze patterns of neuronal activity to understand the physiological mechanisms associated with behavioral changes [20].). Our algorithms look for patterns of conflicts, a fundamental property of covert timing channels. Hence, even if the trojan processing device 100 and the spy processing device 100' dynamically change their communication protocol, the present invention should still be able to detect them based on conflict patterns.

To demonstrate our framework's effectiveness, we use three realistic covert timing channel implementations, two of which (shared caches [10], memory bus [9]) have been demonstrated successfully on Amazon EC2 cloud servers. We evaluate using a full system environment by booting MARSSx86 [21] with Ubuntu 11.04. The simulator models a quad-core processor running at 2.5 GHz, each core with two hyperthreads, and has a few (at least three) other active processes to create real system interference effects. We model a private 32 KB L1 and 256 KB L2 caches. Prior to conducting our experiments, we validated the timing behavior of our covert channel implementations running on MARSSx86 against the timing measurements in a real system environment (dual-socket Dell T7500 server with Intel 4-core Xeon E5540 processors at 2.5 GHz, Ubuntu 11.04).

Note that the three covert timing channels described below are randomly picked to test our detection framework. The covert timing channel detection system 100 is neither limited to nor derived from their specific implementations, and can be used to detect covert timing channels on all shared processor hardware using recurrent patterns of conflicts for covert communication.

A. Covert Timing Channels on Combinational Hardware

To illustrate the covert timing channels that occur on combinational structures and their associated indicator events, we choose the memory bus and integer divider unit (Wang et al [7] showed a similar implementation using multipliers).

In the case of the memory bus covert channel, when the trojan wants to transmit a '1' to the spy, it intentionally performs an atomic unaligned memory access spanning two cache lines. This action triggers a memory bus lock in the system, and puts the memory bus in contended state for most modern generations of processors including Intel Nehalem and AMD K10 family. The trojan repeats the atomic unaligned memory access pattern for a number of times to sufficiently alter the memory bus access timing for the spy to take note of the '1' value transmission. Even on x86 platforms that have recently replaced the shared memory bus with QuickPath Interconnect (QPI), the bus locking behavior is still emulated for atomic unaligned memory transactions spanning multiple cache lines [22].

Figure 2:
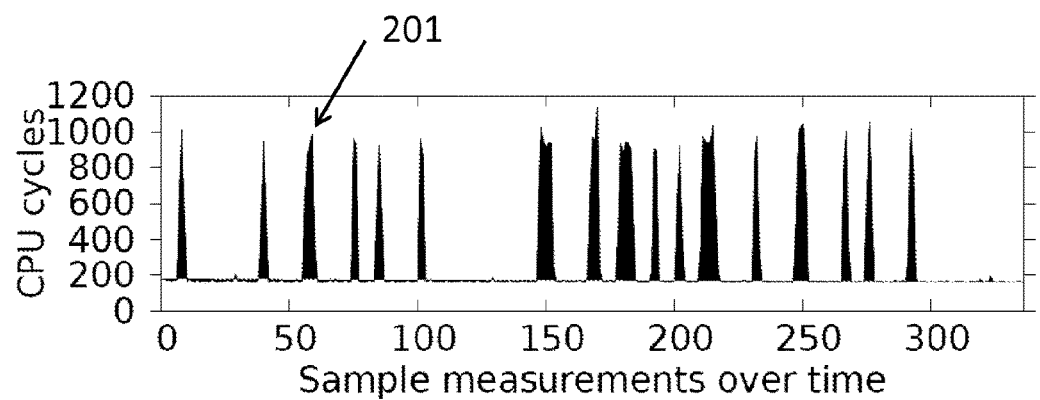
FIG. 2 is a chart showing the average latency per memory access (in CPU cycles) in a Memory Bus Covert Channel.

Consequently, delayed interconnect access is still observable in QPI-based architectures. To communicate a '0', the trojan simply puts the memory bus in un-contended state. The spy deciphers the transmitted bits by accessing the memory bus intentionally through creating cache misses. It times its memory accesses and detects the memory bus contention state by measuring the average latency. The spy accumulates a number of memory latency samples to infer the transmitted bit. FIG. 2 shows the average loop execution time observed by the spy for a randomly-chosen 64-bit credit card number. A contended bus increases the memory latency enabling the spy to infer '1', and an un-contended bus to infer '0'. At point 201, for instance, the status of the contended memory bus is shown, where the spy process observes up to ~1000 CPU cycles to access the memory bus. It shows the frequency of access of a shared combinational structure, for instance the average latency (for a memory bus).

Figure 3:
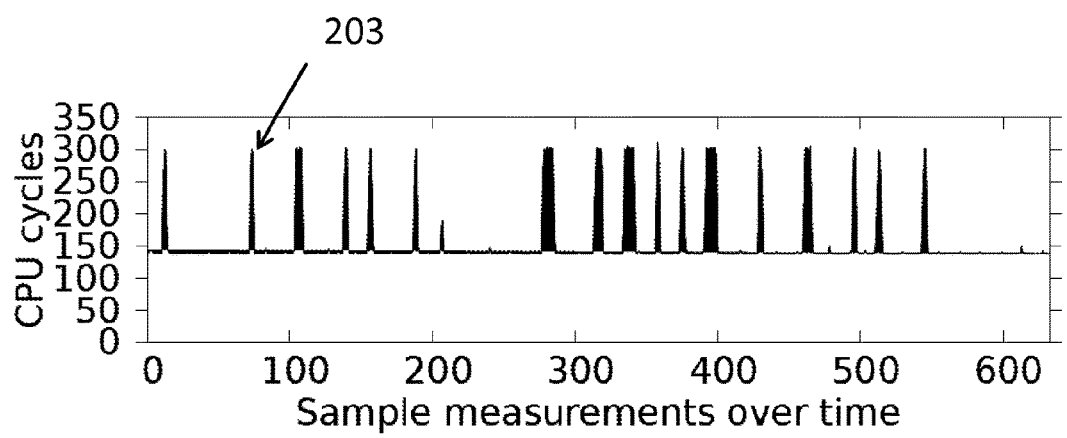
FIG. 3 is a chart showing the average loop execution time (in CPU cycles) in Integer Divider Covert Channel.

For the integer division unit, both the trojan and the spy processes are run on the same core as hyperthreads. The trojan communicates '1' by creating a contention on all of the division units by executing a fixed number of instructions. To transmit a '0', the trojan puts all of the division units in an un-contended state by simply executing an empty loop. The spy covertly listens to the transmission by executing loop iterations with a constant number of integer division operations and timing them. A '1' is inferred on the spy side using iterations that take longer amounts of time (due to contentions on the divider unit created by the trojan), and '0' is inferred when the iterations consume shorter time. FIG. 3 shows the average latency per loop iteration as observed by the spy for the same 64-bit credit card number chosen for memory bus covert channel. We observe that the loop latency is high for '1' transmission and remains low for '0' transmission. At point 203, for instance, the status of contended integer divider is shown, where spy process observes up to ~300 CPU cycles to access the integer divider unit. It shows the average latency for an integer divider.

B. Recurrent Burst Pattern Detection

Figure 4:
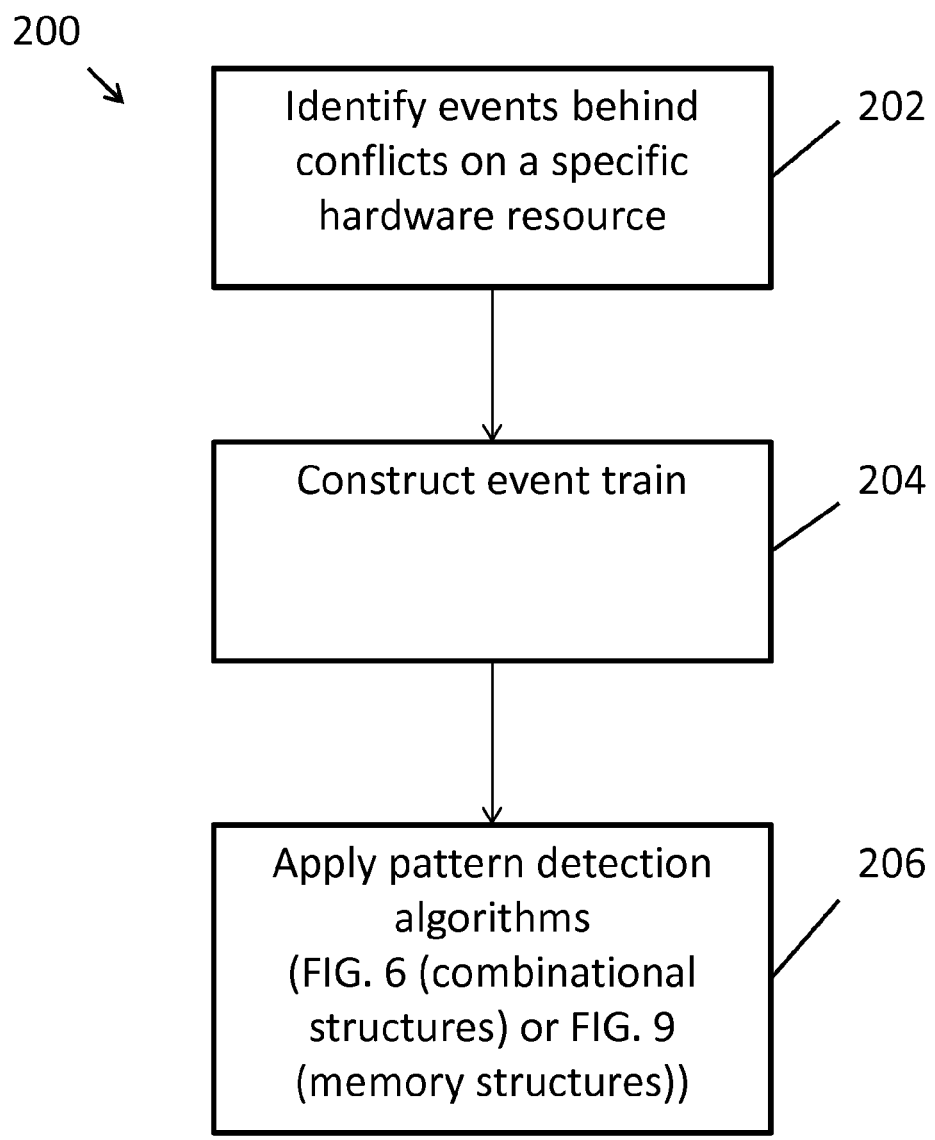
FIG. 4 is a flow chart showing an overview of the operation of the covert timing channel detection system in accordance with the invention.

Turning to FIG. 4, the detection framework 200 of the covert timing channel detection system 100 is shown. Starting at block 202, the first step in detecting covert timing channels is to identify the event that is behind the hardware resource contention. In the case of the memory bus covert channel, the event to be monitored is the memory bus lock operation. In the case of the integer division covert channel, the event to be monitored is the number of times a division instruction from one process (hardware context) waits on a busy divider occupied by an instruction from another process (context). Note that not all division operations fall in this category.

The event is retrieved by an event sensor 150, which is represented by the oval shown in each of the hardware units in FIG. 1B. As used here, the event sensor 150 detects whether the device is being accessed. For combinational structures, the sensor 150 determines if the structure is occupied or not (busy or not). In the case of an integer divider, the event sensor 150 senses integer divider contention, i.e., if the device is busy or not busy.

For memory devices, the sensor 150 determines if there is a conflict miss or not. For instance, in the case of cache covert timing channel, the event sensor 150 senses cache conflict misses. And in the case of a memory bus, the event sensor 150 senses memory bus contention. A contention can occur, for instance, when incoming data is mapped to any available cache (set/block). When the cache runs out of capacity, a miss can occur (i.e., the incoming cache blocks exceeds those available).

The event sensor 150 sends the event (e.g., cache conflict miss event) through a wire to the central CC-auditor hardware unit 122. The auditor 122 is a hardware device that operates a software application to implement the operation of the invention. Thus, the sensor 150 need not be a physical device, but the monitoring activity of the auditor 122. The CC-auditor 122 monitors the activity, such as accumulates events and performs data processing as part of the detection framework. In the case of a cache covert timing channel, the event sensor 150 senses cache conflict misses; in the case of integer divider covert channel, the event sensor senses integer divider contention, and in the case of a memory bus, the event sensor senses bus contention. For instance, in the integer divider covert timing channel, the events that can be monitored include the number of times a division instruction from one process (hardware context) waits on a busy divider occupied by an instruction from another process (context).

Figure 5A:
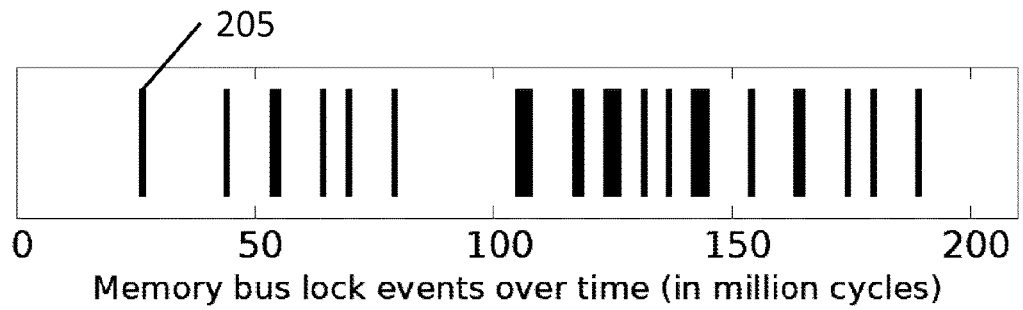
FIG. 5A is an event train plot for a memory bus showing burst patterns.
Figure 5B:
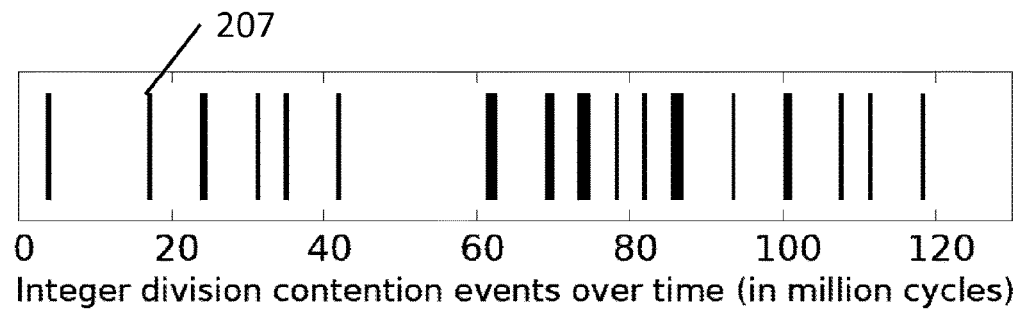
FIG. 5B is an event train plot for an integer divider showing burst patterns.

The second step 204 is to create an Event Train, i.e., a uni-dimensional time series showing the occurrence of events (FIGS. 5A and 5B). While the event sensors 150 transmit signals to the covert channel auditor 122, it forms an event train. A separate event train can be created for each combinational structure and each cache structure and can represent the events that occur over a period of time for that particular structure. We notice a large number of thick bands (or bursty patterns of events) whenever the trojan intends to covertly communicate a '1'.

Thus, at point 205 (FIG. 5A), the vertical line represents a memory bus lock contention event. Since there are many clustered events, these vertical lines become thick bands. In FIG. 5B, point 210 is a vertical line that represents an integer division contention event. Since there are many clustered events, these vertical lines become thick bands as well. The event train can be stored in one of the memory devices, cache or a special system file, to create a log.

In a non-limiting illustrative example of the invention, FIGS. 5A, 5B show how an event train looks visually. As noted above, the event is sent through the wire to the central CC-auditor hardware unit 122, which forms the event train. The CC-auditor 122 accumulates these events in specific hardware structures, for example, the cache conflict miss events are record in the Conflict Miss Tracker hardware 256 (FIG. 12), the integer divider contention events and memory bus contention events are recorded in hardware histograms, such as a histogram buffer, as described below. The system 100, running as a demon process, will periodically poll the hardware structures in the CC-auditor 122, and then calculate likelihood ratios for density histograms, perform clustering algorithms, compute autocorrelation, etc.

At the third step 206, the system 100 analyzes the event train using a recurrent burst pattern detection algorithm. This step consists of two parts: (1) check whether the event train has significant contention clusters (bursts), and (2) determine if the time series pattern exhibits recurrent patterns of bursts. Essentially, this step determines if the event train has a pattern that correlates to a normal communication pattern or a pattern that is indicative of a covert channel communication. Here, the CC-auditor hardware 122 and the software support performs this part. The CC-auditor 122 accumulates events from the event sensors, as noted above, and the system software (as stored in one or more of the cache and/or memory and implemented by the CPU 101, for instance) reads from the CC-auditor's 122 accumulated data, and performs the algorithms shown in FIGS. 6, 9, as will be discussed more fully below.

Figure 6:
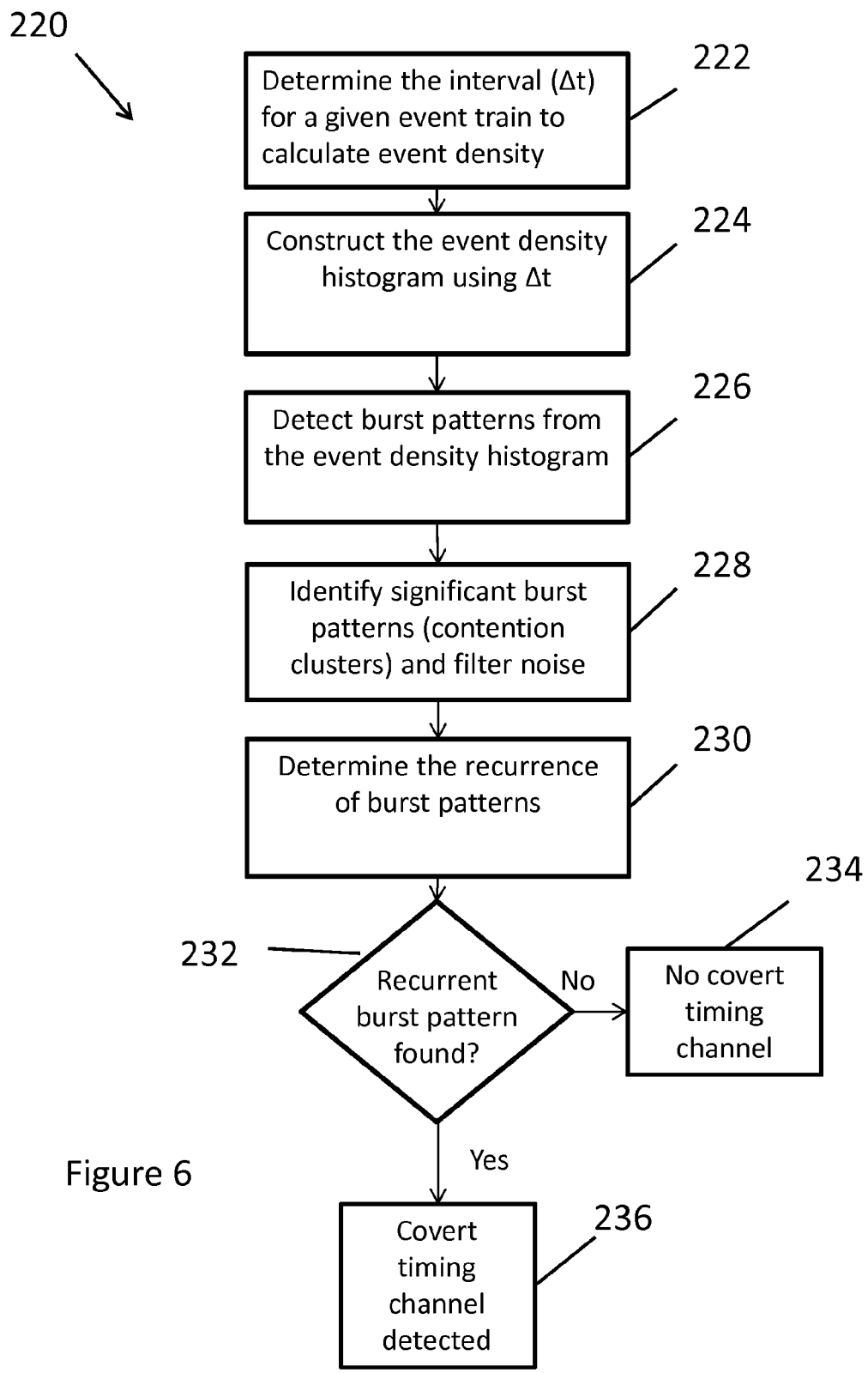
FIG. 6 is a flow chart showing recurrent burst pattern detection for combinational structures.
Figure 9:
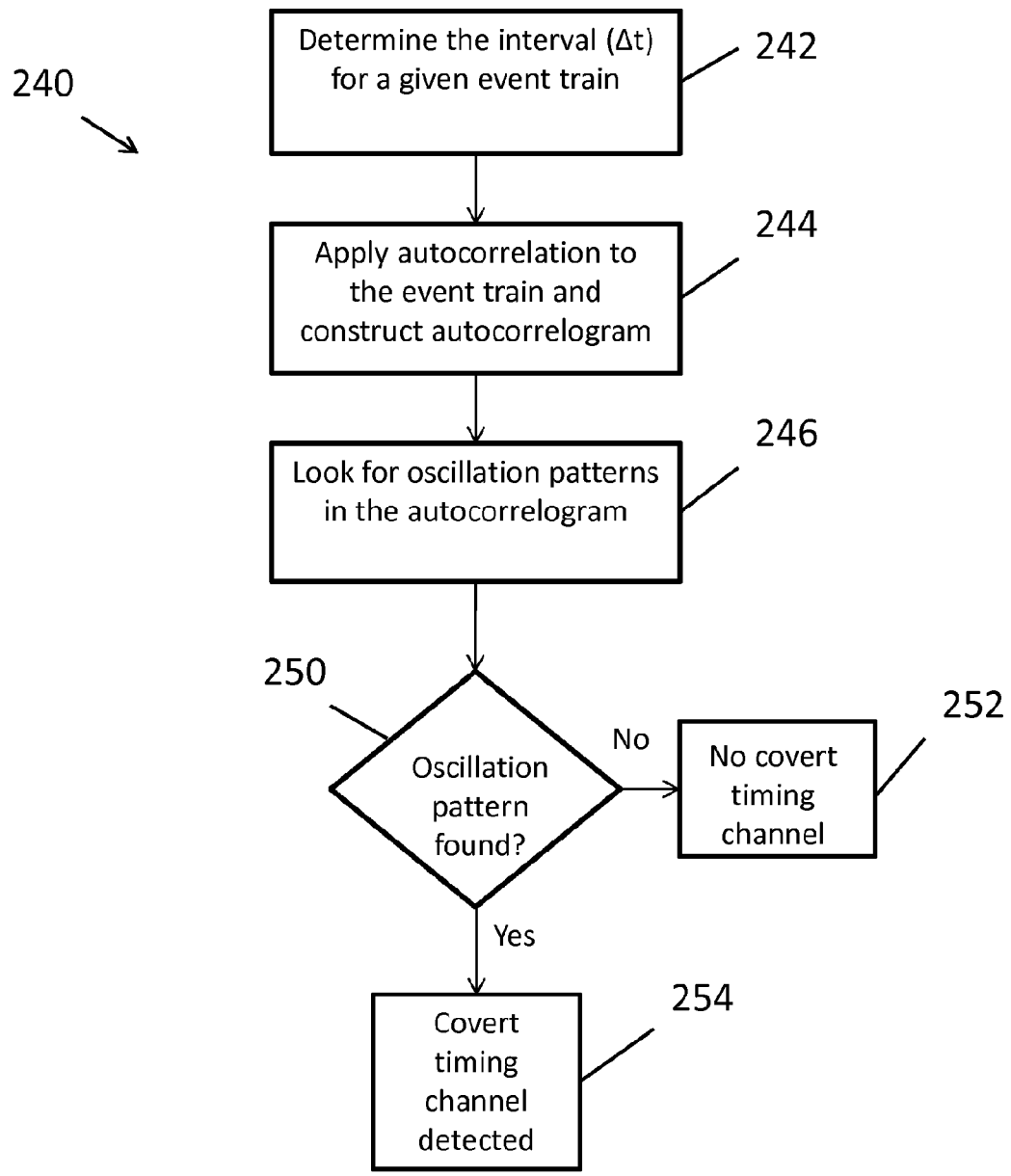
FIG. 9 is a flow chart showing oscillatory pattern detection for memory structures.

If at step 206 (FIG. 4) the system 100 is evaluating a combinational structure (such as the INT ALU 102, FPU 104 and interconnect 120 of FIG. 1B), then it conducts a recurrent burst pattern detection 220 (FIG. 6). On the other hand, if the system 100 is evaluating a memory structure (such as the I-cache, D-cache and L2 cache of FIG. 1B), then it conducts an oscillatory pattern detection 240 in accordance with process 240 (FIG. 9). The algorithms of FIGS. 6 and 9 determine the significance of the burst and its recurrence, to determine if the events in the event train are normal or indicative of a covert timing channel.

Accordingly, the system 100 is implemented on a specific combinational structure or memory structure and determines if a covert channel exists at that structure. For instance, the system 100 can be operated on the L2 cache 114a (FIG. 1B) to determine if a covert channel exists on that L2 cache 114a. The system knows if a unit is a combinational structure or a memory structure based on its operation. If the structure is used to store data, it is a memory structure; otherwise, if it is primarily used for computation or communication, it is a combinational structure. The user can select specific hardware to monitor, and the system applies the relevant algorithm to audit the hardware unit.

Turning to FIG. 6 for a combinational structure, the system 100 determines at step 222, the interval ($\Delta t$) for a given event train to calculate event density. The $\Delta t$ is the product of the inverse of average event rate and $\alpha$, an empirical constant determined using the maximum and minimum achievable covert timing channel bandwidth rates on a given shared hardware. In simple terms, $\Delta t$ is the observation window to count the number of event occurrences within that interval. The value of $\Delta t$ can be picked from a wide range, and is tempered by the $\alpha$ factor which ensures that $\Delta t$ is neither too low (when the probability of a certain number of events within $\Delta t$ follows Poisson distribution) nor too high (when the probability of a certain number of events within $\Delta t$ follows normal distribution). For covert timing channel with the memory bus, $\Delta t$ is determined as 100,000 CPU cycles (or 40 μs), and for the covert timing channel using integer divisions, $\Delta t$ is determined as 500 CPU cycles (or 200 ns). The interval can be within a range for a given hardware. The value of $\Delta t$ can be picked from a wide range, and is tempered by the $\alpha$ factor which ensures that $\Delta t$ is neither too low (when the probability of a certain number of events within $\Delta t$ follows Poisson distribution) nor too high (when the probability of a certain number of events within $\Delta t$ follows normal distribution). This range can be determined by running a series of high bandwidth and low bandwidth synthetic covert channel implementations. On a given hardware, the $\Delta t$ range should be the same.

Thus, the $\Delta t$ first depends on the timing characteristics of the specific hardware resource. Each hardware resource needs some minimal number of CPU cycles to access/use it and that is fixed at hardware design phase. So $\Delta t$ has to be sufficiently larger than this minimal number of CPU cycles. A 4-byte countdown register can be used to count the number of CPU clock cycles. The register initializes itself to the value of $\Delta t$, and counts down by one at every CPU cycle.

Figure 7:
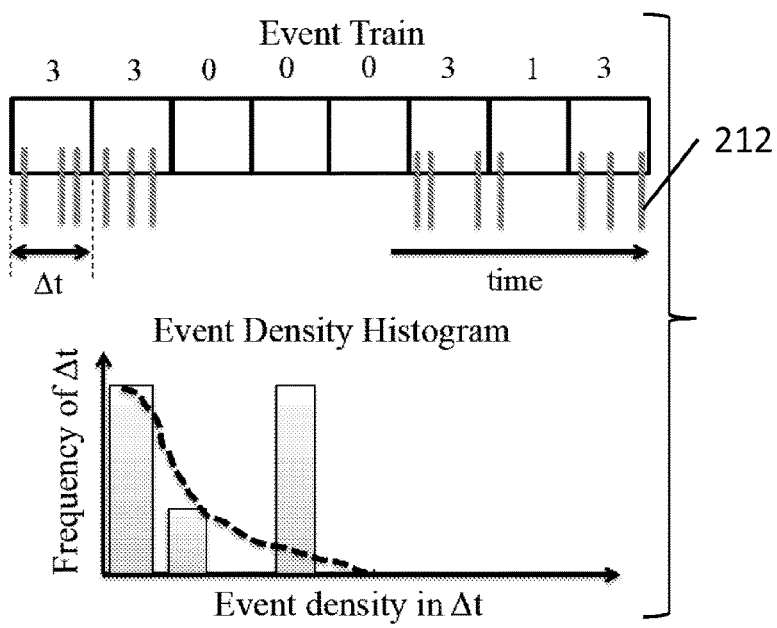
FIG. 7 is an illustration of event train and its corresponding event density histogram, where the distribution is compared against the Poisson Distribution (dotted line) to detect the presence of burst patterns.

Turning to step 224, the system then constructs the event density histogram using $\Delta t$. For each interval of $\Delta t$, the number of events are computed, and an event density histogram is constructed to subsequently estimate the probability distribution of event density. A hardware histogram buffer of 128-entries that are each 16-bits long can be used to construct the event density. An illustration is shown in FIG. 7. The x-axis in the histogram plot shows the range of $\Delta t$ bins that have a certain number of events. Low density bins are to the left, and as we move right, we see the bins with higher numbers of events. The y-axis shows the number of $\Delta t$'s within each bin (e.g., which can be an interval).

At step 226, the system 100 detects burst patterns, by reading the hardware histogram buffer (part of the cc-auditor 122) and checking for burst patterns. From left to right in the histogram, threshold density is the first bin which is smaller than the preceding bin, and equal or smaller than the next bin. If there is no such bin, then the bin at which the slope of the fitted curve becomes gentle is considered as the threshold density. Threshold density denotes the presence of second significant distribution in the event density histogram. If the event train has burst patterns, there will be two distinct distributions: (1) one where the mean of event densities is below 1.0 showing the non-bursty periods, and (2) one where the mean is above 1.0 showing the bursty periods present in the right tail of the event density histogram. There can be many distributions. The presence of three or more indicates that the Trojan/spy are communicating using multiple encoding mechanisms. Each burst distribution beyond the first one shows a specific communication protocol using a certain burst (event density). The presence of more than one simply means that the Trojan/spy are communicating using multiple such burst distributions.

Figure 8A:
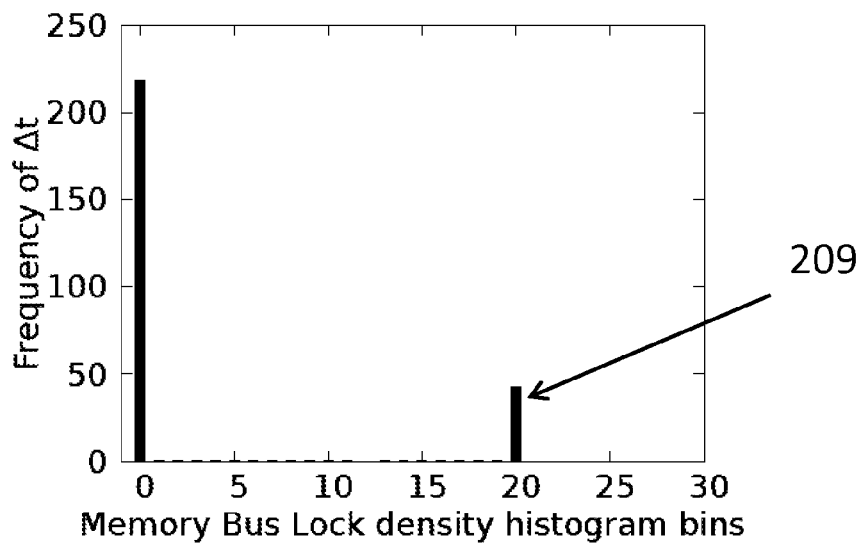
FIG. 8A is an event density histogram for covert timing channels using a memory bus.
Figure 8B:
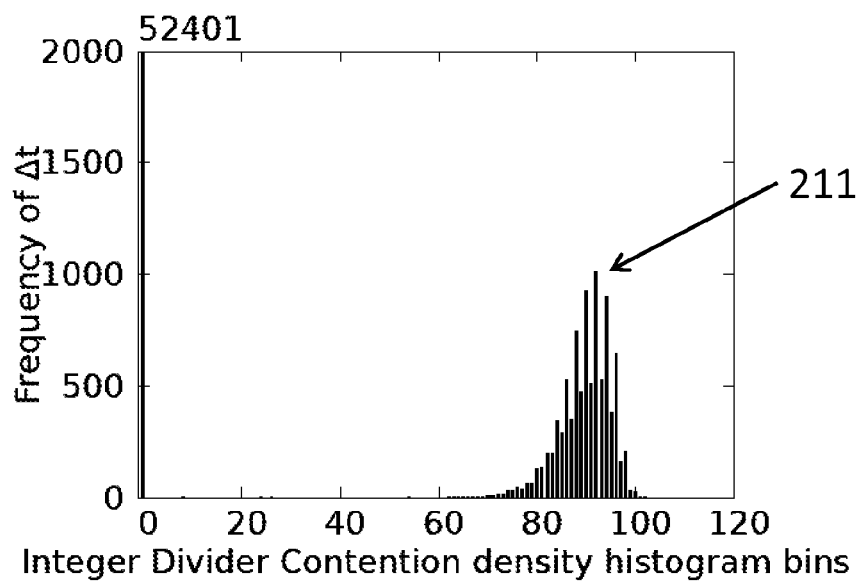
FIG. 8B is an event density histogram for covert timing channels using an integer divider.

FIG. 8 shows the event density histogram distributions for covert timing channels involving bursty contention patterns on the memory bus (FIG. 8A) and the integer division unit (FIG. 8B). For both timing channels, there is significant non-burst patterns in the histogram bin #0. Here, we note that bin #0 shows the number of intervals with zero event occurrences. There's definitely no possibility of a burst if there are no events in that interval. Hence bin #0 is always non-bursty. In the case of the memory bus channel (FIG. 8A), we see a significant bursty pattern at histogram bin #20, point 209. The likelihood ratio for this second distribution is larger than 0.9, which is higher than the threshold value 0.5 on likelihood ratio, which is indicative of a covert timing channel. For the integer division channel (FIG. 8B), there is a very prominent second distribution (burst pattern) at point 211, between bins #84 and #105 with a peak around bin #96. The likelihood ratio for this second distribution is larger than 0.9, which is higher than the threshold value 0.5 and therefore indicative of a covert timing channel.

At step 228 of FIG. 6, the system then identifies significant burst patterns (contention clusters) in the histogram buffer data and filters noise. To estimate the significance of burst distribution and filter random (noise) distributions, we compute the likelihood ratio (the "likelihood ratio" refers to the number of samples in the identified distribution divided by the total number of samples in the population [23]. We omit bin #0 from this computation since it does not contribute to any contention) of the second distribution. The first distribution is normally clustered around bin #0 where 0 or a few events happen in observation intervals. Usually, there isn't any intentional bursts here for the spy/Trojan to reliably communicate. These are natural event density patterns seen in almost all applications. Empirically, based on observing realistic covert timing channels [11], [9], we find that the likelihood ratio of the burst pattern distribution tends to be at least 0.9 (even on very low bandwidth covert channels such as 0.1 bps). On the flip-side, we observe this likelihood ratio to be less than 0.5 among regular programs that have no known covert timing channels despite having some bursty access patterns. We set a conservative threshold for likelihood ratio at 0.5, i.e., all event density histograms with likelihood ratios above 0.5 are considered for further analysis to see whether covert timing channel likely exists.

At step 230, the system determines the recurrence of burst patterns. Once the presence of significant burst patterns are identified in the event series, the next step is to check for recurrent patterns of bursts, step 232. We limit the window of observation to a suitable period, such as 512 OS time quanta (or 51.2 secs, assuming a time quantum of 0.1 secs), to avoid diluting the significance of event density histograms involved in covert timing channels. A pattern clustering algorithm performs two basic steps: (1) discretize the event density histograms into strings, and (2) use k-means clustering to aggregate similar strings. By analyzing the clusters that represent event density histograms with significant bursts, we can find the extent to which burst patterns recur, and hence detect the possible presence of a covert timing channel. If a recurrent burst pattern is found from steps 226-230, the system 100 determines that a covert channel has been detected, step 236, and the system 100 can suspend or kill the detected covert processes. It can also generate an alarm signal to alert the user to the presence of the covert channel and any corrective action that is recommended or taken. If no recurrent burst pattern is found from steps 226-230, the system determines that there is no covert channel, step 234. Since we use clustering to extract recurring burst patterns, our algorithm can detect covert timing channels regardless of burst intervals (i.e., even on low-bandwidth irregular bursts or in the presence of random noise due to interference from the system environment).

C. Covert Timing Channel on Shared Cache

Referring to FIG. 9, the pattern detection 206 (FIG. 4) is shown for when the system 100 is evaluating a memory structure, such as I-cache, D-cache, and L2 cache of FIG. 1B. For a memory structure, the system 100 conducts an oscillatory pattern detection 240. The system 100 starts by determining the interval ($\Delta t$) for a given event train, step 242. In one embodiment of the invention, the interval can be set to one Operating System (OS) time quantum. Each Operating System has a set time quantum, and the system can read the OS parameter to get this number (usually 0.1 secs). A 4-byte countdown register can be used to count the number of CPU 101 clock cycles. The register initializes itself to the value of $\Delta t$, and counts down by one at every CPU cycle. During the $\Delta t$ period of time, the conflict miss tracker hardware 256 (FIG. 12) records cache conflict miss event trains.

Figure 10:
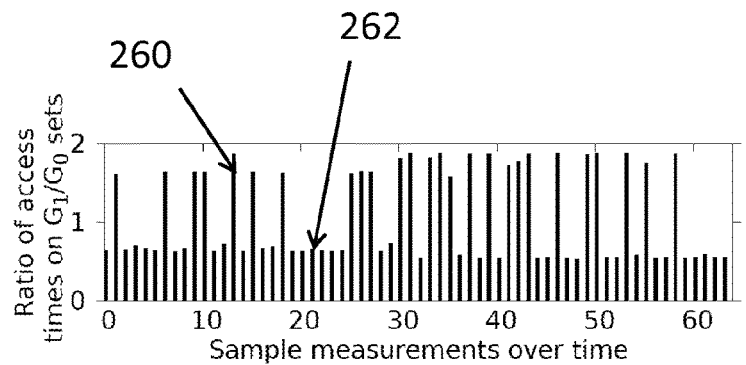
FIG. 10 is a diagram showing ratios of cache access times between $G_1$ and $G_0$ cache sets in a cache covert channel.

Here, the L2 cache-based timing channel (demonstrated by Xu et al [10]) is used. To transmit a '1', the trojan visits a dynamically (the cache sets, where conflict misses are created and detected for covert transmission, are chosen during the covert channel synchronization phase) determined group of cache sets ($G_1$) and replaces all of the constituent cache blocks, and for a '0' it visits another dynamically determined group of cache sets ($G_0$) and replaces all of the constituent cache blocks. The spy infers the transmitted bits as follows: It replaces all of the cache blocks in $G_1$ and $G_0$, and times the accesses to the $G_1$ and $G_0$ sets separately. If the accesses to $G_1$ sets take longer than the $G_0$ sets (that is, all of the $G_1$ sets resulted in cache misses and $G_0$ sets were cache hits), then the spy infers '1'. Otherwise, if the accesses to $G_0$ sets take longer than the $G_1$ sets (that is, all of the $G_0$ sets resulted in cache misses and $G_1$ sets were cache hits), then the spy infers a '0'. FIG. 10 shows the ratio of the average cache access latencies between $G_1$ and $G_0$ cache set blocks observed by the spy for the same 64-bit randomly generated credit card number. A '1' is inferred for ratios greater than 1 (i.e., $G_1$ set access latencies are higher than $G_0$ set access latencies) and a '0' is inferred for ratios less than 1 (i.e., $G_1$ set access latencies are lower than $G_0$ set access latencies). Thus, $G_1$ is the set of all cache sets that Trojan uses to transmit a 1. For instance, the trojan clears it, and the spy infers a 1. G0 is for 0. It discusses watching for conflict misses on cache sets to construct train and decipher if covert activity.

D. Oscillatory Pattern Detection

Unlike combinational structures where timing modulation is performed by varying the inter-event intervals (observed as bursts and non-bursts), cache based covert timing channels rely on the latency of events to perform timing modulation. To transmit a '1' or a '0', the trojan and the spy create a sufficient number of conflict events (cache misses) alternatively among each other that lets the spy decipher the transmitted bit based on the average memory access times (hit/miss). Note that this leads to oscillatory patterns of conflicts between the trojan and spy contexts.

At step 244, the system 100 applies autocorrelation to the event train to construct an autocorrelogram. Oscillation is referred to here as a property of periodicity in an event train. This is different from bursts that are specific periods of high frequency event occurrences in the event train. Oscillation of an event train is detected by measuring its autocorrelation [24]. Autocorrelation is the correlation coefficient of the signal with a time-lagged version of itself, i.e., the correlation coefficient between two values of the same variable, $X_i$ and $X_{i+p}$ separated by a lag p. Thus at step 244, the system 100 (e.g., the software stored in memory and operated by the CPU 101) reads from the covert channel auditor hardware 122, and specifically from the conflict miss tracker component 256 (which is a part of the covert channel auditory 122), and applies autocorrelation to the cache conflict miss event train and construct autocorrelogram.

In general, given the measurements of a variable X, ($X_1$, $X_2$, . . . , $X_N$) at time instances of t ($t_1$, $t_2$, . . . , $t_N$), the autocorrelation coefficient $r_p$ at a time lag of p and mean of X is defined as, $$r_p = \frac{\sum_{i=1}^{n-p}(X_i - \overline{X}) \cdot (X_{i+p} - \overline{X})}{\sum_{i=1}^{n}(X_i - \overline{X})^2}.$$

The autocorrelation function is primarily used for two purposes: (1) detecting non-randomness in data, (2) identifying an appropriate time series model if the data values are not random [24]. To satisfy #1, computing the autocorrelation coefficient for a lag value of 1 ($r_1$) is sufficient. To satisfy #2, autocorrelation coefficients for a sequence of lag values should exhibit significant periodicity.

An autocorrelogram is a chart showing the autocorrelation coefficient values for a sequence of lag values. An oscillation pattern is inferred when the autocorrelation coefficient shows significant periodicity with peaks sufficiently high for certain lag values (i.e., the values of X correlates highly with itself at lag distances of $k_1$, $k_2$ etc.).

At step 248, the system looks at the autocorrelogram for an oscillatory pattern. This is performed, for instance, by: (a) on a data series with N points, find the autocorrelation coefficients for lag values 1 to N−1; (b) check for the amplitudes (maximum and minimum) autocorrelation values and histogram them; (c) check for the wavelength of the series (of autocorellation values); and (d) if there exists a fixed wavelength with absolute values of amplitudes (near 1.0), then an oscillatory pattern is detected. If an oscillatory pattern is identified at step 250, a covert timing channel has been detected 254. If an oscillatory pattern is not identified at step 250, then no covert timing channel is determined to detected 252.

Figure 11A:
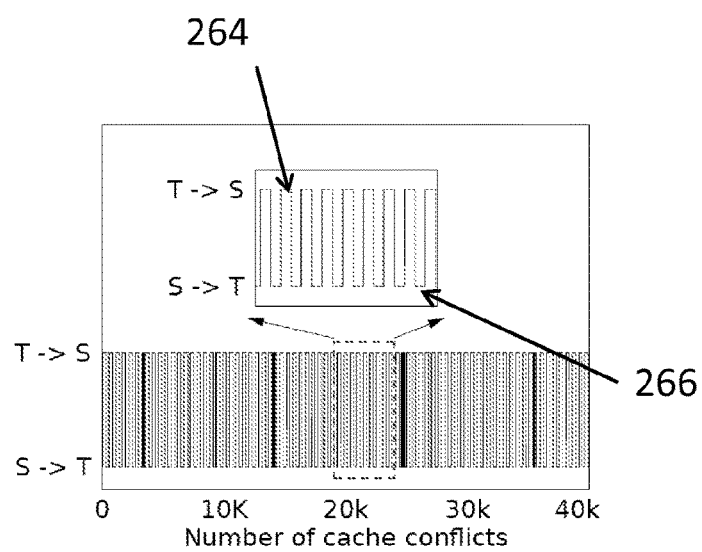
FIG. 11A shows an oscillatory pattern of L2 cache conflict misses between Trojan and spy for an event train (T→S: trojan's (T) conflict misses with spy (S) and S→T: S's conflict misses with T)

FIG. 11 shows the oscillation detection method for the covert timing channel on shared cache. In particular, FIG. 11A shows the event train (cache conflict misses) annotated by whether the conflicts happen due to the trojan replacing the spy's cache sets, or vice versa. "T→S" denotes the trojan (T) replacing the Spy's (S) blocks because the spy had previously displaced those same blocks owned by the trojan at that time. Since the conflict miss train shows a dense cluttered pattern, we show a legible version of this event train as an inset of FIG. 11A.

Figure 11B:
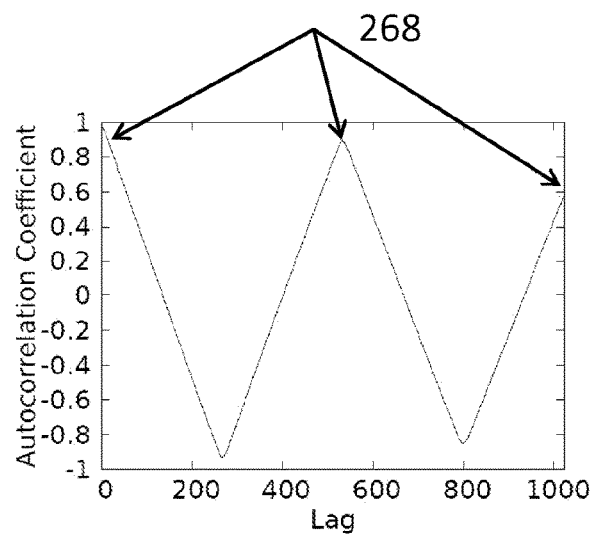
FIG. 11B shows an autocorrelogram for the conflict miss event train.

The conflict misses that are observed within each observation window (typically one OS time quantum) are used to construct a conflict miss event train plot. Every conflict miss in the event train is denoted by an identifier based on the replacer and the victim contexts. Note that every ordered pair of trojan/spy contexts have unique identifiers. For example "S→T" is assigned '0' and "T→S" is assigned "1". The autocorrelation function is computed on this conflict miss event train. FIG. 11B shows the autocorrelogram of the event train. A total of 512 cache sets were used in $G_1$ and $G_0$ for transmission of "1" or "0" bit values. We observe that, at a lag value of 533 (that is very close to the actual number of conflicting sets in the shared cache, 512), the autocorrelation value is highest at about 0.893. The slight offset from the actual number of conflicting sets was observed due to random conflict misses in the surrounding code and the interference from conflict misses due to other active contexts sharing the cache. At a lag value of 512, the autocorrelation coefficient value was also high (≈0.85). To evade detection, the trojan/spy may (with some effort) may deliberately introduce noise through creating cache conflicts with other contexts. This may potentially lower autocorrelation coefficients, but we note that the trojan/spy may face a much bigger problem in reliable transmission due to higher variability in cache access latencies.

One illustrative non-limiting example of the invention is provided in FIGS. 10-11. FIG. 10 shows the ratio of the average cache access latencies between G1 and G0 cache set blocks observed by the spy for the same 64-bit randomly generated credit card number. At point step 260, a '1' is inferred for ratios greater than 1 (i.e., G1 set access latencies are higher than G0 set access latencies), and in step 262, a '0' is inferred for ratios less than 1 (i.e., G1 set access latencies are lower than G0 set access latencies).

FIG. 11 shows the oscillation detection method for the covert timing channel on shared cache. In particular, FIG. 11A shows the event train (cache conflict misses) annotated by whether the conflicts happen due to the trojan replacing the spy's cache sets, or vice versa. "T→S" denotes the Trojan (T) replacing the Spy's (S) blocks because the spy had previously displaced those same blocks owned by the trojan at that time. Since the conflict miss train shows a dense cluttered pattern (point 264 shows a dense cluttered pattern of "T→S" and point 266 shows a dense cluttered pattern of "S→T"), we show a legible version of this event train as an inset of FIG. 11A.

An autocorrelogram is a chart showing the autocorrelation coefficient values for a sequence of lag values. An oscillation pattern is inferred when the autocorrelation coefficient shows significant periodicity with peaks sufficiently high for certain lag values, as shown in step 268, (i.e., the values of X correlates highly with itself at lag distances of k1, k2 etc.).

FIG. 11B shows the autocorrelogram of the event train. A total of 512 cache sets were used in G1 and G0 for transmission of "1" or "0" bit values. We observe that, at a lag value of 533 (that is very close to the actual number of conflicting sets in the shared cache, 512), the autocorrelation value is highest at about 0.893, as shown at 268. The slight offset from the actual number of conflicting sets was observed due to random conflict misses in the surrounding code and the interference from conflict misses due to other active contexts sharing the cache. At a lag value of 512, the autocorrelation coefficient value was also high (about 0.85), as shown at 268. To evade detection, the trojan/spy may (with some effort) deliberately introduce noise through creating cache conflicts with other contexts. This may potentially lower autocorrelation coefficients, but we note that the trojan/spy may face a much bigger problem in reliable transmission due to higher variability in cache access latencies.

Figure 13A:
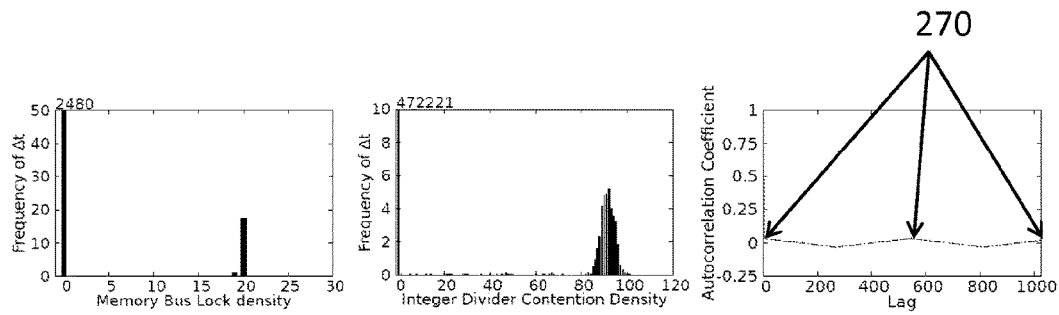
FIGS. 13A, 13B, 13C are diagrams showing bandwidth tests using memory bus, integer divider and cache covert channels for bandwidths of 0.1 bps, 10 bps, and 1000 bps, respectively.
Figure 13B:
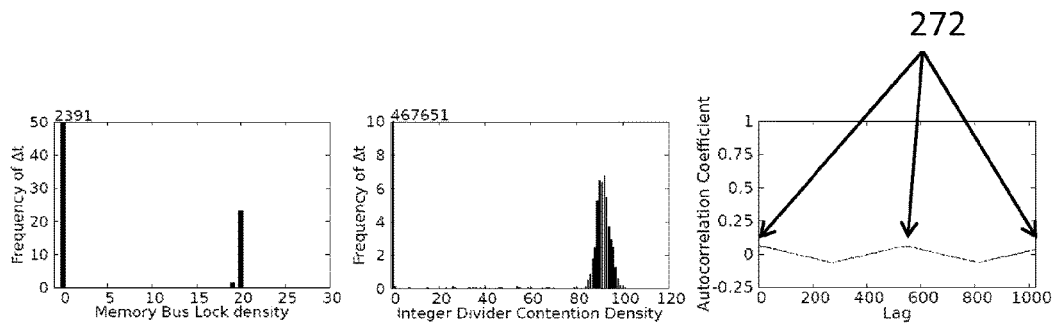
Figure 13C:
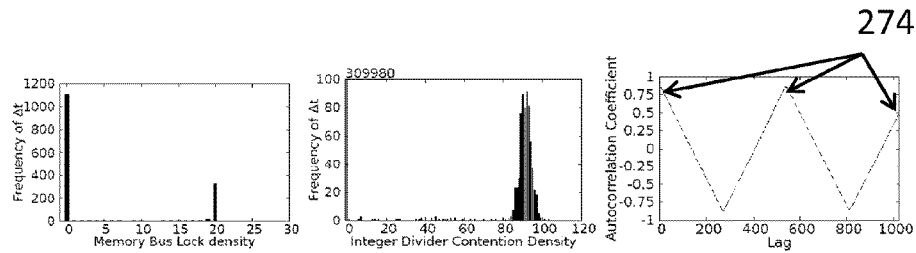
Figure 14A:
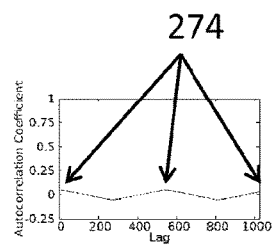
FIGS. 14A, 14B, 14C are autocorrelograms for 0.1 bps cache covert channels at reduced observation window sizes for OS time quanta of 0.75×, 0.5× and 0.25×, respectively.
Figure 14B:
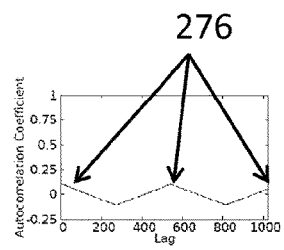
Figure 14C:
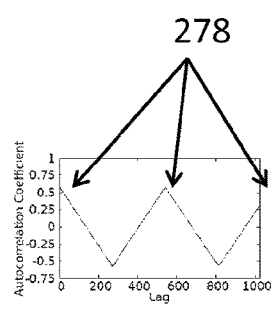
Figure 15A:
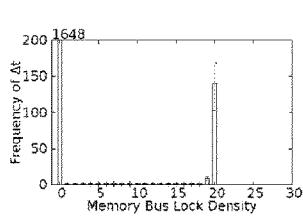
FIGS. 15A, 15B, 15C show a test with 256 randomly generated 64-bit messages on memory bus, integer divider and cache covert channels, where the black (thick) bars are the means, and the arrows above them show the range (min, max)
Figure 15B:
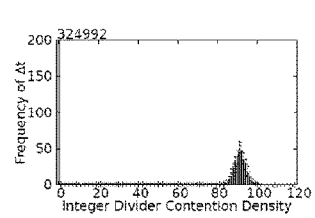
Figure 15C:
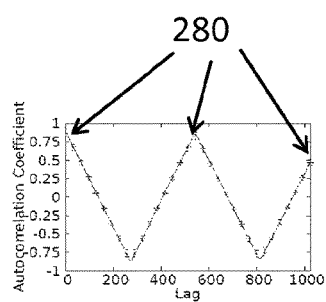

In FIG. 13A, at bandwidth of 0.1 bps, point 270 does not show significant peaks, but still shows periodicity of peaks. In FIG. 13B, at bandwidth of 10 bps, point 272 does not show significant peaks, but still shows periodicity of peaks. In FIG. 13C, at bandwidth of 1000 bps, step 274 (FIG. 14A) show significant peaks and shows periodicity of peaks. FIGS. 14A-14C, as we describe observation window from 0.75 OS quantum to 0.25 OS quantum, we start to observe, at 274, 276 and 278, significant peaks appearing in periodicity. In FIG. 15, point 280 shows significant peaks appearing in periodicity. Points 282-290 all show an autocorrelograms for non-covert channel applications. Points 282-290 do not have significant peaks and they do not have oscillation/periodicity patterns.

Implementation

This section discusses the hardware modifications and software support to implement the covert timing channel detection system 100.

A. Hardware Support

In current microprocessor architectures, we note that most hardware units are shared by multiple threads, especially with the widespread adoption of Simultaneous Multi-Threading (SMT). Therefore, all of the microarchitectural units are potential candidates for timing channel mediums.

The Instruction Set is augmented with a special instruction that lets the user program a covert channel auditor and choose certain hardware units to audit. This special instruction is a privileged instruction that only a subset of system users (usually the system administrator) can utilize for system monitoring. The hardware units have a monitor bit, which when set by the covert channel auditor, places the hardware unit under audit for covert timing channels. The hardware units are wired to fire a signal to the covert channel auditor on the occurrence of certain key indicator events seen in covert timing channels.

In super-secure environments, where performance constraints can be ignored, covert channel auditor hardware can be enabled to monitor all shared hardware structures. However, this would incur unacceptable performance overheads in most real system environments. Therefore, to minimize covert timing channel detection system 100 implementation complexity, we design the covert channel auditor with the capability to monitor up to two different hardware units at any given lime. The user (system administrator) is responsible for choosing the two shared hardware units to monitor based on his knowledge of the current system jobs. We believe that this hardware design tradeoff can prevent unnecessary overheads on most regular user applications.

For most of the core components like execution clusters and logic, the indicator events are conflicts detected by a hardware context when another context is already using them. On certain uncore components like the memory bus, conflicts are created using special events such as bus locks.

To accumulate the event signals arriving from the hardware units, the covert channel auditor contains (1) two 32-bit countdown registers initialized to the computed values of $\Delta t$ based on the two microarchitecture units under monitor (Section IV-B), (2) two 16-bit registers to accumulate the number of event occurrences within $\Delta t$, and (3) two histogram buffers with 128 entries (each entry is 16 bits long) to record the event density histograms. Whenever the event signal arrives from the unit under audit, the accumulator register is incremented by one. At the end of each $\Delta t$, the corresponding 16-bit accumulator value is updated against its entry in the histogram buffer, and the count-down register is reset to $\Delta t$. At the end of OS time quantum, the histogram buffers are recorded by the software module.

For memory structures such as caches, conflict misses are utilized for covert data transmission. A conflict miss happens in a set associative cache when several blocks map into the same cache set and replace each other even when there is enough capacity left in the cache. When the number of blocks in a set exceeds the cache associativity, a block, A, will be evicted even though better candidates for eviction may exist in the cache in other sets. If A is accessed again before those better candidates are replaced, that access is a conflict miss. Note that a folly associative cache of the same capacity would have kept A in the cache, and not incur a conflict miss (due to full associativity). Therefore, to accurately identify the conflict misses in a set-associative cache, we need to check whether the (incoming) block would be retained (not be prematurely replaced) in a fully-associative cache. Ideally, to do so, we need a fully-associative stack with LRU (Least Recently Used) replacement policy that tracks the access recency information for cache blocks. This ideal scheme is expensive due to the frequent stack updates necessary for every cache block access.

Figure 12:
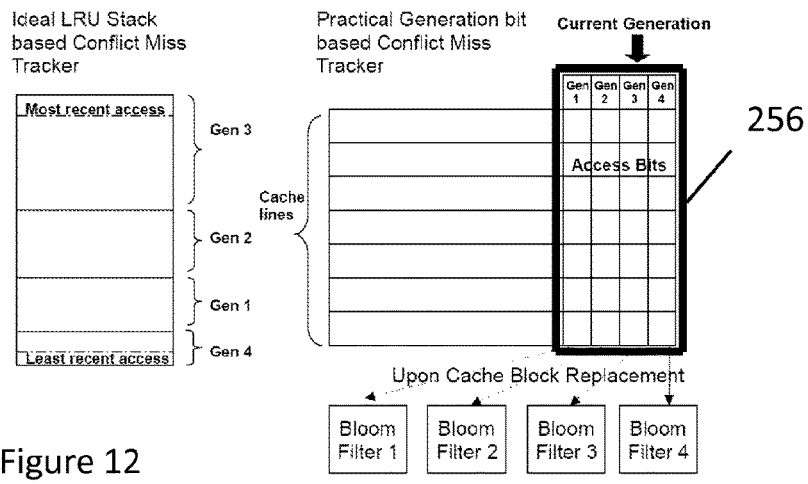
FIG. 12 is a diagram showing conflict miss tracker implementation.

FIG. 12 shows the practical implementation that approximates the LRU stack access-recency information [25], and forms a part of the CC-auditor 122 (FIGS. 1B, 1C). The scheme maintains four generations that are ordered by age. Each generation consists of a set of blocks, and all the blocks in a younger generation have been accessed more recently than any block in an older generation. This means that the blocks in the youngest generation are the blocks that would be at the top of the LRU stack, the next (older) generation corresponds to the next group on the LRU stack, etc. Note that the blocks within a generation itself are unordered. A new empty generation is started when the number of recently accessed cache blocks reaches a threshold, T (that equals to #totalcacheblocks(N)/4 and roughly corresponds to reaching 25% capacity in an ideal LRU stack).

To implement the conflict miss tracker, each cache block metadata field is augmented with four bits to record the generations during which the block was accessed, and three more bits are added to track the current owner context (assuming four cores with two SMT threads). The youngest generation bit in the cache block metadata is set upon block access (to emulate the placement of a cache block at the top of the LRU stack). During block replacement, the replaced cache tags are recorded in a compact three-hash bloom filter corresponding to the latest generation when the block was accessed (to remember its premature removal from the cache before reaching full capacity). If the incoming cache tag is found in one of the bloom filters (a hit in one of the bloom filters means that the cache block was accessed in the corresponding generation, but was replaced to accommodate another more recently accessed block in the same or one of the younger generations), it denotes a conflict miss since the (incoming) block was removed recently from the cache prior to reaching the full N-block cache capacity.

When the number of accessed blocks reaches the threshold, T, the oldest generation is discarded by flash clearing the corresponding generation column in the cache metadata and all of the bits in the respective bloom filter. This action represents the removal of entries from the bottom of the LRU stack. The generation tracking bits are reused similar to circular buffers (FIG. 12), and a separate two bit register (per cache) holds the ID of the current youngest generation.

Since our scheme tracks the conflict misses on all of the cache blocks, we can accurately identify the conflict miss event patterns even if arbitrary cache sets were used by the trojan/spy for covert communication. Inside our covert channel auditor, we maintain two alternating 128-byte vector registers that, upon every conflict miss identified by our practical conflict miss tracker, records the three-bit context IDs of the replacer (context requesting the cache block) and the victim (current owner context in the cache block metadata). When one vector register is full, the other vector register begins to record the data. Meanwhile, the software module records the vector contents in the background (to prevent process stalling), and then clears the vector register for future use. Such tracking of the replacer and the victim represents the construction of conflict miss event train. An autocorrelogram on the conflict miss event series can help detect the presence of cache conflict-based covert timing channel (Section IV-D). Oscillation detection method (Section IV-C) uses this practical implementation to identify cache conflict misses. Occasionally, during context switches, the trojan or spy may be scheduled to different cores. Fortunately, the OS (and software layers) have the ability to track the possible migration of processes during context switches. With such added software support, we can identify trojan/spy pairs correctly despite their migration.

1) Area, Latency and Power Estimates of covert channel auditor: We use Cacti 5.3 [26] to estimate the area, latency and power needed for our covert channel auditor hardware. Table I shows the results of our experiments. For the two histogram buffers, we model 128-entries that are each 16-bits long. For registers, we model two 128-byte vector registers, two 16-bit accumulators, and two 4-byte countdown registers. For the conflict miss detector, we model 4 three-hash bloom filters with (4×#totalcacheblocks) bits, seven metadata bits per cache block (four generation bits plus three bits of owner context). Our experimental results show that the covert timing channel detection system 100 hardware area overheads are insignificant compared to the total chip area (e.g., 263 mm$^2$ for Intel i7 processors [27]). The covert channel auditor hardware has latencies that are less than the processor clock cycle time (0.33 ns for 3 GHz). Also, the extra bits in the cache metadata array increase the cache access latency slightly by about 1.5%, and is unlikely to extend the clock cycle period. Similarly, the dynamic power drawn by covert channel auditor hardware is in the order of a few milliwatts compared to 130 W peak in Intel i7 [27].

TABLE I

Area, Power and Latency Estimates of CC-Auditor

|  | Histogram Buffers | Registers | Conflict Miss Detector |
|---|---|---|---|
| Area(mm$^2$) | 0.0028 | 0.0011 | 0.004 |
| Power(mW) | 2.8 | 0.8 | 5.4 |
| Latency(ns) | 0.17 | 0.17 | 0.12 |

B. Software Support

In order to place a microarchitectural unit under audit, the user requests the covert channel auditor through a special software API exported by the OS, where the OS performs user authorization checks. This is to prevent the sensitive system activity information from being exploited by attackers.

A separate daemon process (part of covert timing channel detection system software support) accumulates the data points by recording the histogram buffer contents at each OS time quantum (for contention-based channels) or the 128-byte vector register (for oscillation-based channels). Lightweight code is carefully added to avoid perturbing the system state, and to record performance counters as accurately as possible [28]. To further reduce perturbation effects, the OS schedules the covert timing channel detection system 100 monitors on (currently) un-audited cores.

Since our analysis algorithms are run as background processes, they incur minimal effect on system performance. Our pattern clustering algorithm is invoked every 51.2 secs (Section IV-B) and takes 0.25 secs (worst case) per computation. We note that further optimizations such as feature dimension reduction improves the clustering computation time to 0.02 secs (worst case). Our autocorrelation analysis is invoked at the end of every OS time quantum (0.1 secs) and takes 0.001 secs (worst case) per computation.

Evaluation and Sensitivity Study

A. Varying Bandwidth Rates

We conduct experiments by altering the bandwidth rates of three different covert timing channels from 0.1 bps to 1000 bps. The results (observed over a window of OS time quantum, 0.1 secs) are shown in FIGS. 13A, 13B, 13C. While the magnitudes of Δt frequencies decrease for lower bandwidth contention-based channels, the likelihood ratios for second (burst) distribution are still significant (higher than 0.9) (the histogram bins for the second distribution (covert transmission) are determined by the number of successive conflicts needed to reliably transmit a bit and the timing characteristics of the specific hardware resource) on low-bandwidth cache covert channels such as 0.1 bps, despite observing periodicity in autocorrelation values, we note that their magnitudes do not show significant strength.

We conduct additional experiments by decreasing the windows of observation to fractions of OS time quantum on 0.1 bps channel. This fine grain analysis is especially useful for lower-bandwidth channels that create a certain number of conflicts per second (needed to reliably transmit a bit) frequently followed by longer periods of dormancy. FIGS. 14A, 14B, 14C shows that, as we reduce the sizes of the observation window, the autocorrelograms show significant repetitive peaks for 0.1 bps channel. Our experiments suggest that autocorrelation analysis at finer granularity observation windows can detect lower-bandwidth channels more effectively.

B. Encoded Message Patterns

To simulate encoded message patterns that the trojan may use to transmit message, we generate 256 random 64-bit combinations, and use them as inputs to the covert timing channels. Our experimental results are shown in FIG. 15. Mean values of histogram bins are shown by dark bars that are annotated by the range (maximum, minimum) of bin values observed across the 128 runs. Despite variations in peak magnitudes of Δt frequencies (especially in integer divider), we notice that our algorithm still shows significant second distributions with likelihood ratios above 0.9. For autocorrelograms in cache covert channels, we notice insignificant deviations in autocorrelation coefficients.

C. Varying Cache Channel Implementations

Figure 16A:
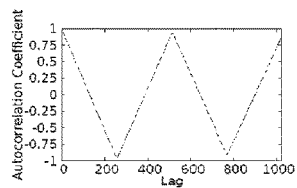
FIGS. 16A, 16B, 16C are diagrams showing autocorrelograms for cache covert channel with 256, 128, and 64 cache sets for communication (covert channel); and, FIGS. 17A, 17B, 17C, 17D, 17E are diagrams showing the event density histograms and autocorrelograms in pair-wise combinations of SPEC2k6, stream & filebench for gobmk_sjeng, bzip2_h264ref, stream_stream, mailserver-_mailserver, and webserver_webserver, respectively.
Figure 16B:
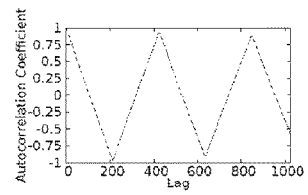
Figure 16C:
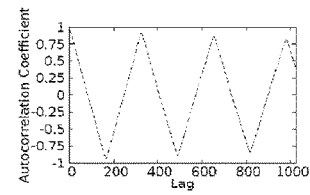
Figure 17A:
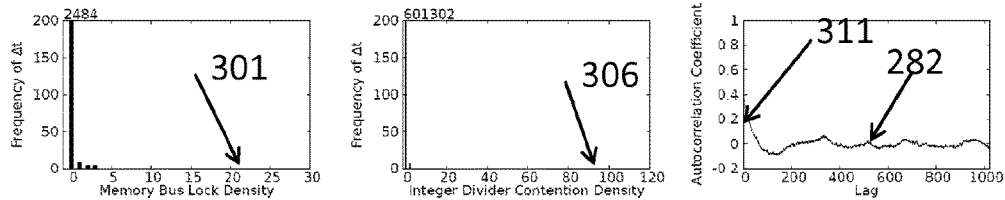
Figure 17B:
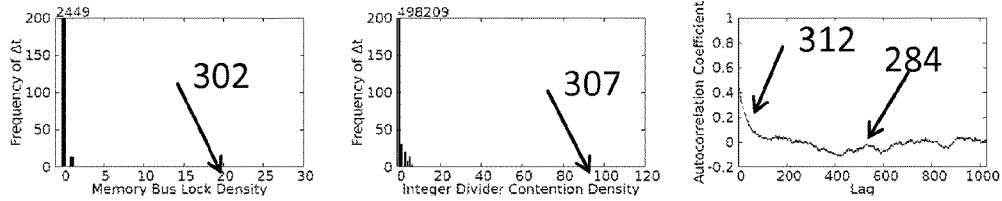
Figure 17C:
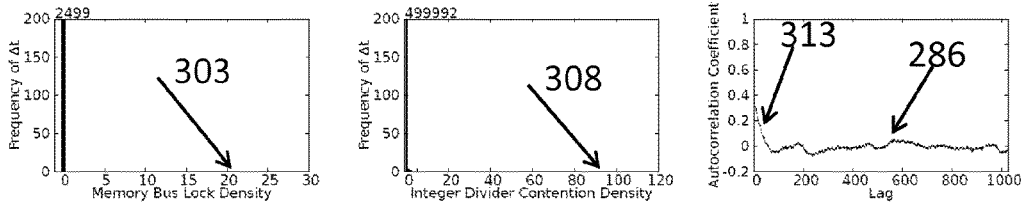
Figure 17D:
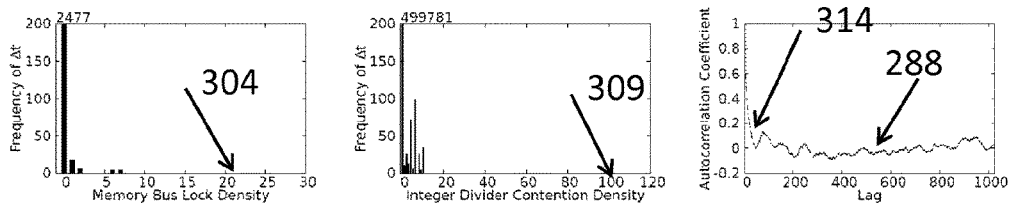
Figure 17E:
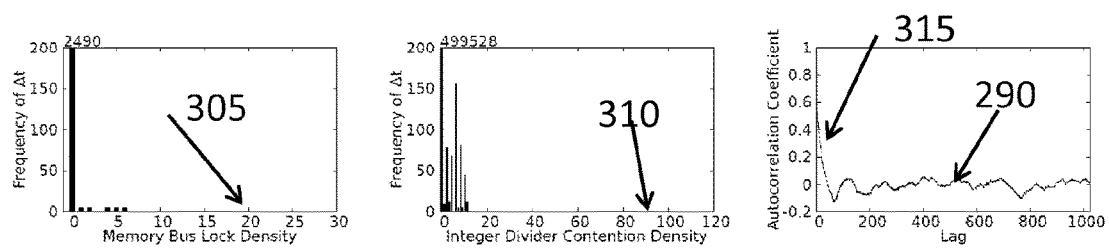

We implement the cache covert timing channels by varying the number of cache sets used for bit transmission from 64 to 512. In FIGS. 16A, 16B, 16C, we find that the autocorrelograms in all of the cases show significant periodicity in autocorrelation with maximum peak correlation values of around 0.95, a key characteristic observed in covert timing channels. For covert channels that uses a smaller number of cache sets, note that random conflict misses occurring on other cache sets and interference from other active processes increase the wavelength of the autocorrelogram curve beyond the expected values (typically the number of cache sets used n covert communication).

D. Testing for False Alarms

We test our recurrent burst and oscillation pattern algorithms on 128 pair-wise combinations of several standard SPEC2006, Stream and Filebench benchmarks run simultaneously on the same physical core as hyperthreads. We pick two different types of servers from Filebench—(1) webserver, that emulates web-server I/O activity producing a sequence of open-read-close on multiple files in a directory tree plus a log file append (100 threads are used by default), (2) mailserver, that stores each e-mail in a separate file consisting of a multi-threaded set of create-append-sync, read and delete operations in a single directory (16 threads are used by default). The individual benchmarks are chosen based on their CPU-intensive (SPEC2006) and memory- and I/O-intensive (Stream and Filebench) behavior, and are paired such that we maximize the chances of them creating conflicts on a particular microarchitectural unit. As examples, (1) both gobmk and sjeng have numerous repeated accesses to the memory bus, (2) both bzip2 and h264ref have a significant number of integer divisions. The goal of our experiments is to study whether these benchmark pairs create similar levels of recurrent bursts or oscillatory patterns of conflicts that were observed in realistic covert channel implementations (which, if true, could potentially lead to a false alarm). Despite having some regular bursts and conflict cache misses, all of the benchmark pairs are known to not have any covert timing channels. FIGS. 17A-17E present a representative subset of our experiments. We observe that most of the benchmark pairs have either zero or random burst patterns for both memory bus lock (first column) and integer division contention (second column) events. The only exception is mailserver pairs, where we observe a second distribution with bursty patterns between histogram bins #5 and #8.

Upon further examination, we find that the likelihood ratios for these distributions was less than 0.5 (which is significantly less than the ratios seen in all of our covert timing channel experiments). In almost all of the autocorrelograms (third column), we observe that the autocorrelation coefficients do not exhibit any noticeable periodicity typically expected of cache covert timing channels. The only exception was for webserver where we see a very brief period of periodicity between lag values 120 and 180, but becomes non-periodic beyond lag values of 180. Therefore, we did not observe any false alarms. Also, regardless of the "cover" programs that embed the trojan/spy, the covert timing channel detection system 100 is designed to catch the covert transmission phases in the programs that should be already synchronized between the trojan and the spy. Hence, we do not believe that the cover program characteristics could lead to false negatives.

Points 301-314 (FIGS. 17A-17E) show non-covert timing channel cases. At points 301-305, no significant second distribution is seen around bin #20. Thus, the likelihood ratio of the second distribution is less than 0.5, therefore no covert timing channel is detected. At points 306-310, no significant second distribution is seen around bin #20. Thus, the likelihood ratio of the second distribution is less than 0.5, so no covert timing channel is detected. At points 311-315, no oscillation pattern is seen, so no covert timing channel is detected.

It is noted that the event train only indicates that there are cache conflict misses between processes. It does not provide quantitative measurements. As discussed above, the autocorrelogram has a set of autocorrelation values that are used to quantitatively measure randomness and oscillation of cache conflict misses.

Related Work

The notion of covert channel was first introduced by Lampson et al [29]. Hu et al [3] proposed fuzzing the system clock by randomizing interrupt timer period between 1 ms and 19 ms. Unfortunately, this approach could significantly affect the system's normal bandwidth and performance in the absence of any covert timing channel activity. Recent works have primarily focused on covert information transfer through network channels [30], [31] and mitigation techniques [12], [13], [32]. Among the studies that consider processor-based covert timing channels, Wang and Lee [7] identify two new covert channels using exceptions on speculative load (ld.s) instructions and SMT/Multiplier unit. Wu et al. [9] present a high-bandwidth and reliable covert channel attack that is based on the QPI lock mechanism where they demonstrate their results on Amazon's EC2 virtualized environment. Ristenpart et al. [6] present a method of creating a cross-VM covert channel by exploiting the L2 cache, which adopts the Prime+Trigger+Probe [33] to measure the timing difference in accessing two pre-selected cache sets and decipher the covert bit. Xu et al. [10] construct a quantitative study over cross-VM L2 cache covert channels and assess their harm of data exfiltration. Our framework is tested using the examples derived from such prior covert timing channel implementations on shared hardware.

To detect and prevent covert timing channels, Kemmerer et al. [14] proposed a shared matrix methodology to statically check whether potential covert communications could happen using shared resources. Wang and Lee [34] propose a covert channel model for an abstract system specification. Unfortunately, such static code-level or abstract model analyses are impractical on every single third-party application executing on a variety of machine configurations in today's computing environments, especially when most of these applications are available in binary-only format.

Side channels are information leakage mechanisms where a certain malware secretly profiles a legitimate application (via differential power, intentional fault injection etc.) to obtain sensitive information. Wang and Lee [16], [35] propose three secure hardware cache designs, Partition-Locking (PL), Random Permutation (RP) and Newcache to defend against cache-based side channel attacks. Kong et al. [15] show how secure software can use the PL cache. Martin et al. [36] propose changes to the infrastructure (timekeeping and performance counters) typically used by side channels such that it becomes difficult for the attackers to derive meaningful clues from architectural events. Demme et al. [37] introduce a metric called Side Channel Vulnerability Factor (SVF) to quantify the level of difficulty for exploiting a particular system to gain side channel information. Many of the above preventative techniques complement the covert timing channel detection system 100 by serving to provide enhanced security to the system.

Demme et al [38] explore simple performance counters for malware analysis. This strategy is not applicable for a number of covert channels because they use specific timing clock by randomizing interrupt timer period between 1 ms events to modulate hardware resources that may not be measurable through the current performance counter infrastructure. For instance, the integer divider channel should track cycles where one thread waits for another (unsupported by current hardware). Using simple performance counters as alternatives will only lead to a high number of false positives. Also, using machine learning classifiers without considering the time modulation characteristics of covert timing channels could result in false alarms.

The following documents are incorporated herein by reference: [1] NIST, "National Vulnerability Database," 2013. [2] J. Gray III, "On introducing noise into the bus-contention channel," in IEEE Computer Society Symposium on Security and Privacy, 1993. [3] W.-M. Hu, "Reducing timing channels with fuzzy time," Journal of Computer Security, vol. 1, no. 3, 1992. [4] K. Okamura and Y. Oyama, "Load-based covert channels between xen virtual machines," in ACM Symposium on Applied Computing, 2010. [5] C. Percival, "Cache missing for fun and profit," BSDCan, 2005. [6] T. Ristenpart, E. Tromer, H. Shacham, and S. Savage, "Hey, you, get off of my cloud: exploring information leakage in third-party compute clouds," in ACM conference on Computer and communications security, 2009. [7] Z. Wang and R. B. Lee, "Covert and side channels due to processor architecture," in IEEE Computer Security Applications Conference, 2006. [8] J. C. Wray, "An analysis of covert timing channels," Journal of Computer Security, vol. 1, no. 3, 1992. [9] Z. Wu, Z. Xu, and H. Wang, "Whispers in the hyper-space: high-speed covert channel attacks in the cloud," in USENIX conference on Security symposium, 2012. [10] Y. Xu, M. Bailey, F. Jahanian, K. Joshi, M. Hiltunen, and R. Schlichting, "An exploration of L2 cache covert channels in virtualized environments," in ACM workshop on Cloud computing security workshop, 2011. [11] B. Saltaformaggio, D. Xu, and X. Zhang, "Busmonitor: A hypervisor-based solution for memory bus covert channels," EUROSEC, 2013. [12] S. Cabuk, C. E. Brodley, and C. Shields, "Ip covert channel detection," ACM Transactions on Information and System Security, vol. 12, no. 4, 2009. [13] S. Gianvecchio and H. Wang, "Detecting covert timing channels: an entropy-based approach," in ACM conference on Computer and communications security, 2007. [14] R. A. Kemmerer, "Shared resource matrix methodology: An approach to identifying storage and timing channels," ACM Transactions on Computer Systems, vol. 1, no. 3, 1983. [15] J. Kong, O. Aciicmez, J.-P. Seifert, and H. Zhou, "Hardware-software integrated approaches to defend against software cache-based side channel attacks," in IEEE Intl. Symp. on High Performance Computer Architecture, 2009. [16] Z. Wang and R. B. Lee, "New cache designs for thwarting software cache-based side channel attacks," in ACM International symposium on Computer architecture, 2007. [17] Department of Defense Standard, Trusted Computer System Evaluation Criteria. US Department of Defense, 1983. [18] H. Okhravi, S. Bak, and S. King, "Design, implementation and evaluation of covert channel attacks," in International Conference on Technologies for Homeland Security, 2010. [19] N. E. Proctor and P. G. Neumann, "Architectural implications of covert channels," in National Computer Security Conference, vol. 13, 1992. [20] Y. Kaneoke and J. Vitek, "Burst and oscillation as disparate neuronal properties," Journal of neuroscience methods, This material is based upon work supported by the vol. 68, no. 2, 1996. [21] A. Patel, F. Afram, S. Chen, and K. Ghose, "MARSSx86: A Full System Simulator for x86 CPUs in Design Automation Conference 2011, 2011. [22] Intel Corporation, "Intel 7500 chipset," Datasheet, 2010. [23] NIST Engineering Statistics Handbook, "Maximum Likelihood," 2013. [24] G. E. Box, G. M. Jenkins, and G. C. Reinsel, Time series m analysis: forecasting and control. Wiley, 2011, vol. 734. [25] G. P. V. Venkataramani, "Lowcost and efficient architectural support for correctness and performance debugging," Ph.D. Dissertation, Georgia Institute of Technology, 2009. [26] HP Labs, "Cacti 5.1," quid.h-pl.hp.com:9081/cacti/, 2008. [27] Intel Corporation, "Intel core i7-920 processor," http://ark.intel.com/Product.aspx?id=37147, 2010. [28] J. Demme and S. Sethumadhavan, "Rapid identification of architectural bottlenecks via precise event counting," in IEEE International Symposium on Computer Architecture, 2011. [29] B. W. Lampson, "A note on the confinement problem," Commun. ACM, vol. 16, no. 10, October 1973. [30] S. Gianvecchio, H. Wang, D. Wijesekera, and S. Jajodia, "Model-based covert timing channels: Automated modeling and evasion," in Recent Advances in Intrusion Detection. Springer, 2008, pp. 211-230. [31] K. Kothari and M. Wright, "Mimic: An active covert channel that evades regularity-based detection," Comput. Netw., vol. 57, no. 3, February 2013. [32] A. Shabtai, Y. Elovici, and L. Rokach, A survey of data leakage detection and prevention solutions. Springer, 2012. [33] E. Tromer, D. A. Osvik, and A. Shamir. "Efficient cache attacks on aes, and countermeasures," J. Cryptol., vol. 23, no. 2, January 2010. [34] Z. Wang and R. B. Lee, "New constructive approach to covert channel modeling and channel capacity estimation," in International Conference on Information Security, 2005. [35] Z. Wang and R. Lee, "A novel cache architecture with enhanced performance and security," in IEEE/ACM International Symposium on Microarchitecture, 2008. [36] R. Martin, J. Demme, and S. Sethumadhavan, "Timewarp: rethinking timekeeping and performance monitoring mechanisms to mitigate side-channel attacks," in ACM International Symposium on Computer Architecture, 2012. [37] J. Demme, R. Martin, A. Waksman, and S. Sethumadhavan, "Side-channel vulnerability factor: A metric for measuring information leakage," in ACM International Symposium on Computer Architecture, 2012. [38] J. Demme, M. Maycock, J. Schmitz, A. Tang, A. Wakstnan, S. Sethumadhavan, and S. Stolfo, "On the feasibility of online malware detection with performance counters," in IEEE International Symposium on Computer Architecture, 2013. [39] File system and Storage Lab, "Filebench," http://sourceforge.net/apps/mediawiki/filebench, 2011. [40] Standard Performance Evaluation Corporation, "Spec 2006 benchmark suite," www.spec.org, 2006. [41] J. D. McCalpin, "Memory bandwidth and machine balance in current high performance computers," IEEE Technical Committee on Computer Architecture Newsletter, 1995.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A method for detecting a covert timing channel in a hardware device having a plurality of a memory hardware structures, the method comprising:

selecting, by an instruction set architecture having a special instruction, a memory hardware structure from the plurality of memory hardware structures;

identifying by a conflict miss tracker hardware, cache conflict miss events at the selected memory hardware structure, said identifying comprising:

tracking by the conflict miss tracker hardware, generations comprising a set of cache blocks that are recently accessed for the selected memory hardware structure, wherein a set of generation bits are within the metadata for each cache block;

recording by a bloom filter, replaced cache blocks in the cache block generation for the selected memory hardware structure; and identifying at the conflict miss tracker hardware, an event comprising a conflict miss when the bloom filter records a replaced cache block that was replaced by a more recently accessed cache block in the same generation or a younger generation;

constructing an event train based on those cache conflict miss events identified by the conflict miss tracker hardware;

detecting in the event trains on the conflict miss tracker hardware, oscillating patterns in the event train;

determining by the conflict miss tracker hardware, that a covert timing channel exists on the selected memory hardware structure at a microarchitecture-level if an oscillatory pattern is detected.

2. A system for detecting a covert timing channel on hardware device having a plurality of memory hardware structures, said system comprising:

an instruction set architecture having a special instruction to select a memory hardware structure from the plurality of memory hardware structures;

a conflict miss tracker hardware configured to identify cache conflict miss events for the selected memory hardware structure, construct an event train based on those events, detect oscillatory patterns in the event train, and determine that a covert timing channel exists on the selected memory hardware structure at a microarchitecture-level if an oscillatory pattern is detected, wherein said conflict miss tracker hardware comprises:

a set of generation bits within the metadata for each cache block configured to track generations, each generation comprising a set of cache blocks that are recently accessed for the selected memory hardware structure;

a bloom filter configured to record replaced cache blocks in said cache block generation for the selected memory hardware structure; and wherein said conflict miss tracker hardware identifies an event comprising a conflict miss when said bloom filter records a replaced cache block that was replaced by a more recently accessed cache block in the same generation or a younger generation.

3. The system of claim 2, wherein the selected memory hardware structure comprises one of an instruction cache, data cache, and a level-2 cache.

4. The system of claim 2, wherein said special instruction selects a subset of memory hardware structures from the plurality of memory hardware structures, the subset of memory hardware structures comprising a plurality of selected memory hardware structures; and wherein said conflict miss tracker hardware identifies events, constructs an event train, detects oscillatory patterns, and determines that a covert timing channel exists, for each one of the subset of selected memory hardware structures.

5. A system for detecting a covert timing channel in a hardware device having a plurality of combinational hardware structures and a plurality of memory hardware structures, said system comprising:

an instruction set architecture having a special instruction to select one or more combinational hardware structures from the plurality of combinational hardware structures, and one or more memory hardware structures from the plurality of memory hardware structures;

a monitor hardware configured to monitor the selected one or more combinational hardware structures at a microarchitecture-level, accumulate microarchitecture-level events at the selected one or more combinational hardware structures, construct an event train based on those accumulated microarchitecture-level events, detect recurrent burst patterns in the event train, and determine that a covert timing channel exists on the selected one or more combinational hardware structures at a microarchitecture-level if a recurrent burst pattern is detected; and a conflict miss tracker hardware configured to identify cache conflict miss events for the selected one or more memory hardware structures, construct an event train based on those identified events, detect oscillatory patterns in the event train, and determine that a covert timing channel exists on the selected one or more memory hardware structures at a microarchitecture-level if an oscillatory pattern is detected, wherein said conflict miss tracker hardware comprises:

a set of generation bits within the metadata for each cache block configured to track generations, each generation comprising a set of cache blocks that are recently accessed for the selected memory hardware structure;

a bloom filter configured to record replaced cache blocks in said cache block generation for the selected memory hardware structure;

wherein said conflict miss tracker hardware identifies an event comprising a conflict miss when said bloom filter records a replaced cache block that was replaced by a more recently accessed cache block in the same generation or a younger generation.

6. The system of claim 5, wherein event information pertaining to the plurality of combinational hardware structures is accumulated in one or more registers.

7. The system of claim 5, wherein event information pertaining to the plurality of memory hardware structures is accumulated in one or more vector registers.

8. The system of claim 5, wherein the plurality of combinational hardware structures each comprise one of an integer arithmetic unit, floating point unit, a memory bus controller, and an interconnect.

9. The system of claim 5, wherein said monitor hardware detects recurrent burst patterns by determining an interval for a given event train to calculate event density, construct an event density histogram and detect burst patterns, identity significant burst patterns, and determine recurrence of significant bursts.

10. The system of claim 9, wherein the interval is a multiple of a cycle for the selected combinational hardware structure.

11. The system of claim 10, wherein the interval is 100,000 CPU cycles.

12. The system of claim 9, wherein the interval is an inverse of average event rate and an empirical constant based on a maximum and minimum achievable covert timing channel bandwidth rate for the selected combinational hardware structure.

13. The system of claim 9, wherein the event density histogram includes an estimate a probability distribution of event density based on a number of events for each interval.

14. The system of claim 9, wherein significant burst patterns are based on a likelihood ratio for a distribution in the event train.

15. The system of claim 9, wherein if a significant burst pattern is detected, then further determining recurrent patterns of burst.

16. The system of claim 5, said monitor hardware is further configured to receive events from the selected combinational hardware structure and construct the event train, whereby the event train comprises an occurrence of the received events for the selected combinational hardware structure.

17. The system of claim 5, wherein said special instruction selects a subset of combinational hardware structures from the plurality of combinational hardware structures, the subset of combinational hardware structures comprising a plurality of selected combinational hardware structures; and wherein said counter register hardware monitors, identifies events, constructs an event train, detects recurrent burst patterns, and determines that a covert timing channel exists, for each one of the subset of selected combinational hardware structures.

* * * * *